US011644874B2

(12) United States Patent
Kuramochi

(10) Patent No.: US 11,644,874 B2
(45) Date of Patent: May 9, 2023

(54) MULTIAXIAL HINGE DEVICE AND ELECTRONIC DEVICE USING THE SAME

(71) Applicant: KEM HONGKONG LIMITED, Tsimshatsui (HK)

(72) Inventor: Ryuta Kuramochi, Kanagawa (JP)

(73) Assignee: KEM HONGKONG LIMITED, Tsimshatsui (HK)

( * ) Notice: Subject to any disclaimer, the term of this patent is extended or adjusted under 35 U.S.C. 154(b) by 0 days.

(21) Appl. No.: 17/494,224

(22) Filed: Oct. 5, 2021

(65) Prior Publication Data

US 2022/0137675 A1 May 5, 2022

(30) Foreign Application Priority Data

Oct. 29, 2020 (JP) .............................. JP2020-181518

(51) Int. Cl.
*G06F 1/16* (2006.01)
*H04M 1/02* (2006.01)

(52) U.S. Cl.
CPC .......... *G06F 1/1681* (2013.01); *H04M 1/022* (2013.01)

(58) Field of Classification Search
None
See application file for complete search history.

(56) References Cited

U.S. PATENT DOCUMENTS

| 10,545,541 | B1* | 1/2020 | Dighde | F16M 11/06 |
| 10,761,573 | B2* | 9/2020 | Hsu | G06F 1/1681 |
| 2018/0356858 | A1* | 12/2018 | Siddiqui | G06F 1/1681 |
| 2021/0307186 | A1* | 9/2021 | Hong | G06F 9/30 |
| 2022/0019270 | A1* | 1/2022 | Su | G06F 1/1681 |

FOREIGN PATENT DOCUMENTS

JP 2020-125841 A 8/2020

* cited by examiner

*Primary Examiner* — Anthony Q Edwards
*Assistant Examiner* — Rashen E Morrison
(74) *Attorney, Agent, or Firm* — Notaro, Michalos & Zaccaria P.C.

(57) ABSTRACT

A multiaxial hinge that can smoothly realize and stably maintain a closed state of the first and the second casings and provide a multiaxial hinge in which creases or sags are hardly produced on the flexible display sheet in a closed state of the first and the second casings constructed to form space capable of accommodating a folded portion of the flexible display sheet folded when the first casing and the second casing are closed between the base plate on one hand and the front side plate and the rear side plate on the other is disclosed.

5 Claims, 20 Drawing Sheets

MULTIAXIAL HINGE DEVICE AND ELECTRONIC DEVICE USING THE SAME

RELATED APPLICATION

This application claims priority on Japanese Patent Application No. 2020-181518 filed Oct. 29, 2020, which claim is repeated herein.

FIELD OF THE INVENTION

The invention relates to a multiaxial hinge device suitably used in an electronic device, such as mobile phone, electronic notebook, PDA, netbook and notebook PC, which is built by attaching a flexible display sheet made e.g. of organic EL across respective surfaces of a first and a second casings; it further relates to an electronic device using such a multiaxial hinge device.

BACKGROUND ART

Recently, an electronic device, such as mobile phone, which is built by attaching a single flexible display sheet made of organic EL across respective surfaces of a first and a second casings has been developed and is establishing its presence step by step. As a hinge device coupling a first casing and a second casing of such an electronic device, such that these casings are openable and closable relative to each other, a multiaxial hinge device using a plurality of hinge pins is known in Patent Document 1 as mentioned below. This multiaxial hinge device is designed such that a bent part has a constant radius of curvature in a space part inside the multiaxial hinge device in order to prevent a flexible display sheet from snapping or causing failure when the first casing and the second casing are opened and closed. The one disclosed in JP Laid-Open Patent Application No. 2020-125841 being a publicly known document is well known.

In some multiaxial hinge devices, if their flexible display sheet with a cross section curved in the droplet shape has a large repulsive force, such a curved flexible display sheet pushes to open the first and the second casings in a closed state, so that these multiaxial hinge devices cannot maintain the closed state while supporting the own weight of the electronic device. Furthermore, in case that the flexible display sheet has a low attaching accuracy relative to the first and the second casings, creases or sags are sometimes produced on the flexible display sheet in a closed state of the first and the second casings.

SUMMARY OF THE INVENTION

The invention has an object to provide a multiaxial hinge device capable of smoothly realizing a closed state of the first and the second casings and of maintaining it. The invention has an object to provide a multiaxial hinge device in which creases or sags are hardly produced on the flexible display sheet in a closed state of the first and the second casings.

To solve the above problem, a multiaxial hinge device of the present invention is a multiaxial hinge device for an electronic device in which a flexible display sheet is attached across two surfaces of a first casing and a second casing, wherein the multiaxial hinge device is provided on a lower side of the flexible display sheet and connects the first casing and the second casing to each other, such that they are openable and closable; wherein it comprises a base plate provided in a right and left direction on respective rear end sides of the first casing and the second casing facing each other; a front side plate and a rear side plate rotatably attached respectively on the front and rear sides of the base plate via a first hinge pin and a second hinge pin; a first attaching plate and a second attaching plate attached to the base plate via a first axially supporting pin portion and a second axially supporting pin portion, such that the first attaching plate and the second attaching plate are slidably rotatable, wherein the respective rear ends of the first casing and second casing rotatably attached to each free end side of the first attaching plate and the second attaching plate via a third hinge pin and a fourth hinge pin, wherein the multiaxial hinge device is constructed to be able to form a space between the front side plate and the rear side plate, wherein the space is capable of accommodating a folded portion of the flexible display sheet folded when the first and second casings are closed, it is characterized in that it comprises a synchronous rotation mechanism for synchronously rotating the front side plate and the rear side plate as the first and second casings are opened and closed, and an urging mechanism for urging the front side plate and the rear side plate in the closing direction, and capable of maintaining the closed state and the opened state of the front side plate and the rear side plate, wherein the urging mechanism comprises compression coil springs compressed in the front and rear direction along the base plate, and a pair of slide cams provided on both ends of the compression coil spring, and a pair of cam followers provided on the front side plate and the rear side plate to slide the slide cams and compress the compression coil spring in the front and rear direction as these rotate through the first hinge pin and the second hinge pin.

Next, a multiaxial hinge device according to a second aspect is characterized in that it comprises a tension adjusting mechanism for adjusting a tension of a flexible display sheet by moving at least one of a first attaching plate and a second attaching plate in a front and rear direction depending on the tension of the flexible display sheet, and the tension adjusting mechanism comprises a slider abutting against at least one of a third hinge pin and a fourth hinge pin to slide in a front and rear direction, and compression coil springs provided between at least one of the first attaching plate and the second attaching plate on one hand, and the slider on the other.

Next, a multiaxial hinge device according to a third aspect is characterized in that a synchronous rotation mechanism is built by meshing a first lever gear rotatably attached to a base plate via a third axially supporting pin and driven by a rotation via a first hinge pin of a front side plate with a second lever gear rotatably attached to a base plate via a fourth axially supporting pin and driven by a rotation via a second hinge pin of a rear side plate.

Next, a multiaxial hinge device according to a fourth aspect is characterized in that a synchronous rotation mechanism comprises a drawing mechanism for drawing a front side plate and a rear side plate into a closed state and an opened state to stop its rotation, and the drawing mechanism comprises a fixing cam plate provided by rotatably linking a third axially supporting pin and a fourth axially supporting pin, a pair of rotary cam plates provided on the third axially supporting pin and the fourth axially supporting pin by locking their respective rotations, and a compressing spring member for compressing an overlapping area of the fixing cam plate and the rotary cam plates.

Next, a multiaxial hinge device according to a fifth aspect is a multiaxial hinge device for an electronic device in which a flexible display sheet is attached across two surfaces of a first casing and a second casing, wherein the multiaxial hinge device is provided on a lower side of the flexible display sheet and connects the first casing and the second casing to each other so that they are openable and closable; wherein it comprises a base plate provided in a right and left direction on respective rear end sides of the first casing and the second casing facing each other; a front side plate and a rear side plate rotatably attached respectively on the front and rear sides of the base plate via a first hinge pin and a second hinge pin; a first attaching plate and a second attaching plate attached to the base plate via a first axially supporting pin portion and a second axially supporting pin portion, such that the first attaching plate and the second attaching plate are slidably rotatable, wherein the respective rear ends of the first casing and second casing rotatably attached to each free end side of the first attaching plate and the second attaching plate via a third hinge pin and a fourth hinge pin, wherein the multiaxial hinge device is constructed to be able to form a space between the front side plate and the rear side plate, wherein the space is capable of accommodating a folded portion of the flexible display sheet folded when the first and second casings are closed, it is characterized in that it comprises a synchronous rotation mechanism for synchronously rotating the front side plate and the rear side plate as the first and second casings are opened and closed, and a tension adjusting mechanism for adjusting a tension of a flexible display sheet by moving at least one of a first attaching plate and a second attaching plate in a front and rear direction depending on the tension of the flexible display sheet, and the tension adjusting mechanism comprises a slider abutting against at least one of a third hinge pin and a fourth hinge pin to slide in a front and rear direction, and compression coil springs provided between at least one of the first attaching plate and the second attaching plate on one hand, and the slider on the other.

To solve the above problem, an electronic device of the present invention is characterized in that it uses a multiaxial hinge device according to one of a first to fifth aspects.

If the invention is constructed as in a first aspect, it can maintain a stable closed state of a first casing and a second casing while supporting the own weight of an electronic device, even under a large repulsive force of a flexible display sheet with a cross section curved in the droplet shape.

If the invention is constructed as in a second aspect, creases or sags are hardly produced on a flexible display sheet in a closed state of the first and the second casings, even if the flexible display sheet has a low attaching accuracy.

If the invention is constructed as in a third aspect, a synchronous rotation mechanism enables a synchronized rotation of a first attaching plate and a second attaching plate to symmetrically open and close them, which further enhances an operability of a multiaxial hinge device. Still further, a synchronous rotation mechanism can be realized in a relatively simple structure with a small number of parts, which further makes a multiaxial hinge device thin.

If the invention is constructed as in a fourth aspect, a drawing mechanism draws a first attaching plate and a second attaching plate into a closed state and an opened state from points respectively close to the closed state and the opened state to finally stop them. This makes the closed state and the opened state of a multiaxial hinge device 6 stable and enhances an operability of the multiaxial hinge device 6.

If the invention is constructed as in a fifth aspect, creases or sags are hardly produced on a flexible display sheet in a closed state of the first and the second casings, even if the flexible display sheet has a low attaching accuracy relative to the first and the second casings.

If the invention is constructed as in a sixth aspect, it can maintain a stable closed state of an electronic device while supporting the own weight of the electronic device, even under a large repulsive force of a flexible display sheet with a cross section curved in the droplet shape.

EMBODIMENTS

In the following, embodiments of a multiaxial hinge device and an electronic device using a multiaxial hinge device are described in details, with reference to attached drawings. FIGS. 1 to 4 schematically show a mobile phone (smartphone) being an example of the electronic device using the multiaxial hinge device according to the invention. In the following drawings, a free end side at which the first casing 2 and the second casing 3 are opened is referred to as front end side, and a side at which the first casing 2 and the second casing 3 are coupled to each other by the multiaxial hinge device 6 as rear end side. Furthermore, a left side in a right and left direction as seen from the front end side of the first casing 2 is referred to as left side portion, and a right side as right side portion; an upper side in an up and down direction is referred to as upper side portion, and a lower side as lower side portion; and a side close to an observer in a front and rear direction is referred to as front side, and a deep side as rear side. Therefore, a direction in which the first casing 2 and the second casing 3 are coupled to each other is referred to as front and rear direction, and a width direction perpendicular to the front and rear direction as right and left direction.

Figure 1:
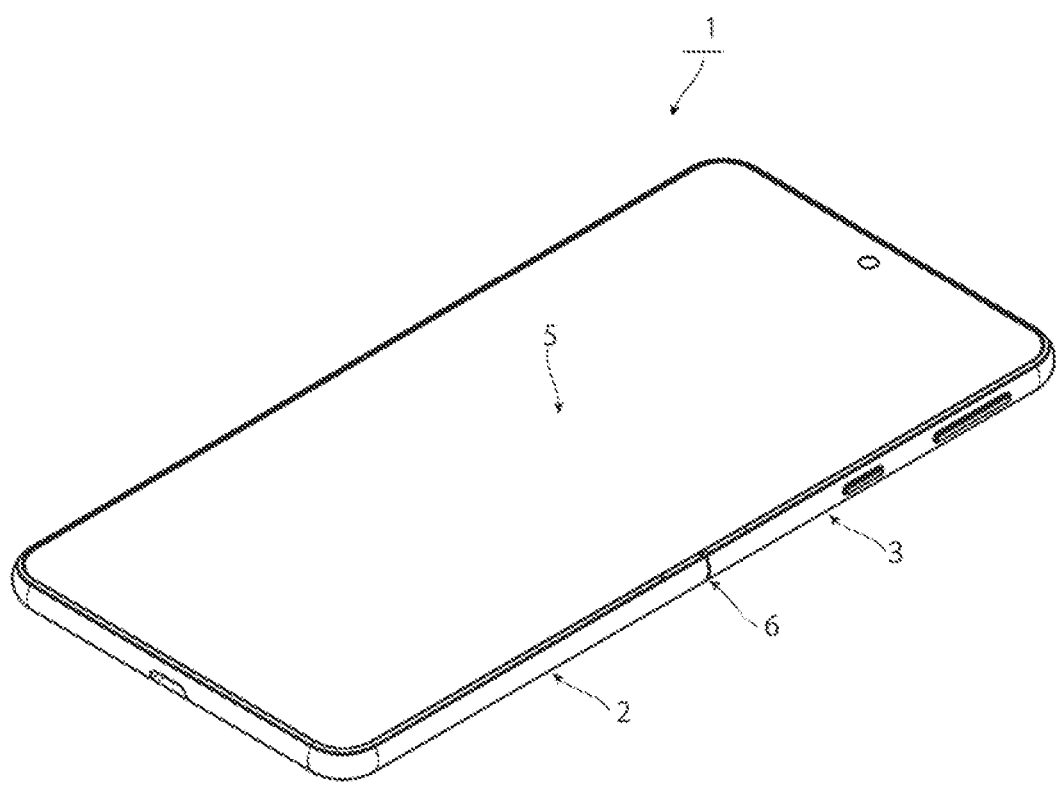
FIG. 1 shows an electronic device having a multiaxial hinge device of the present invention in a perspective view illustrating a state of a first casing and a second casing opened 180 degrees.
Figure 2:
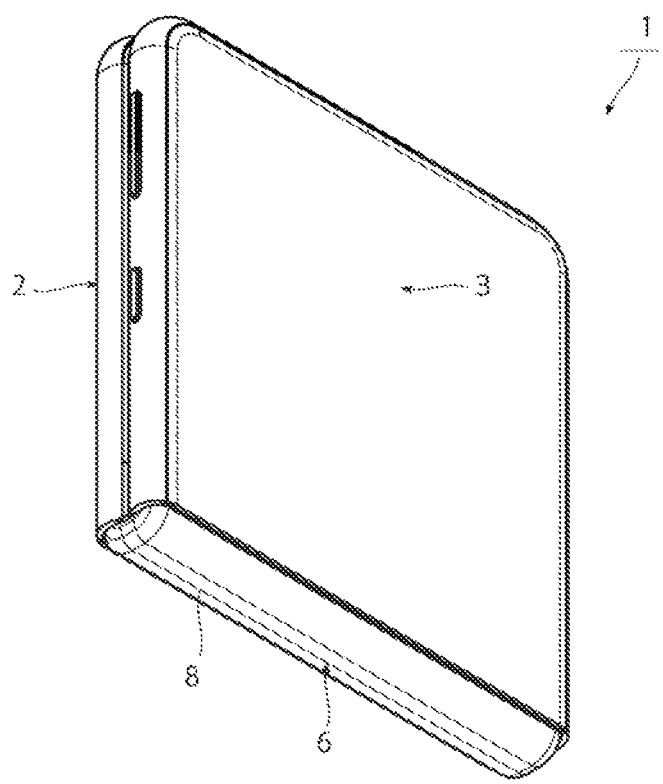
FIG. 2 is a perspective view showing a closed state of a first casing and a second casing closed to 0 degree in an electronic device shown in FIG. 1.
Figure 3:
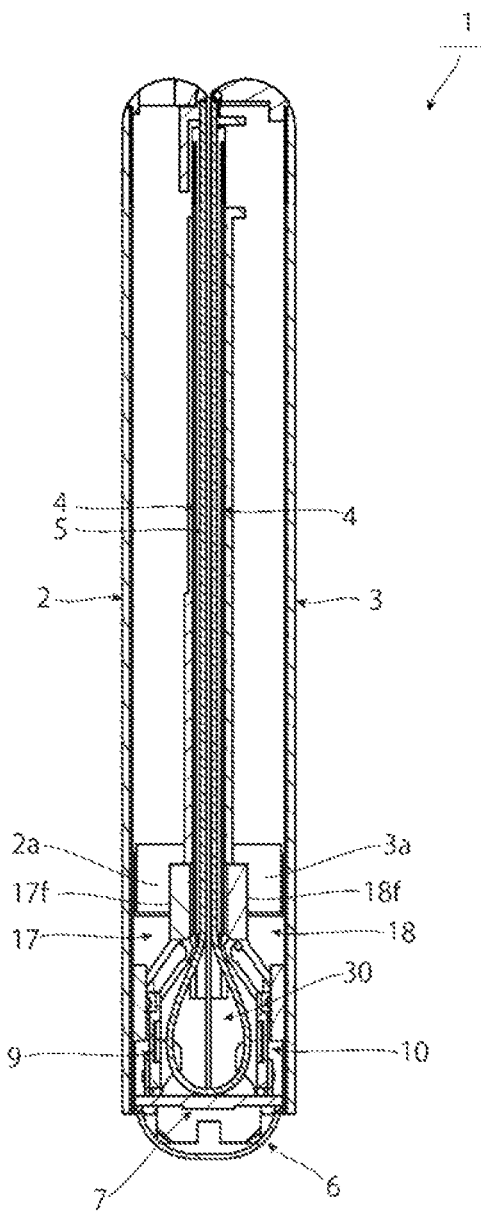
FIG. 3 is a cross section showing a closed state of a first casing and a second casing closed to 0 degree in an electronic device shown in FIG. 1.
Figure 4:
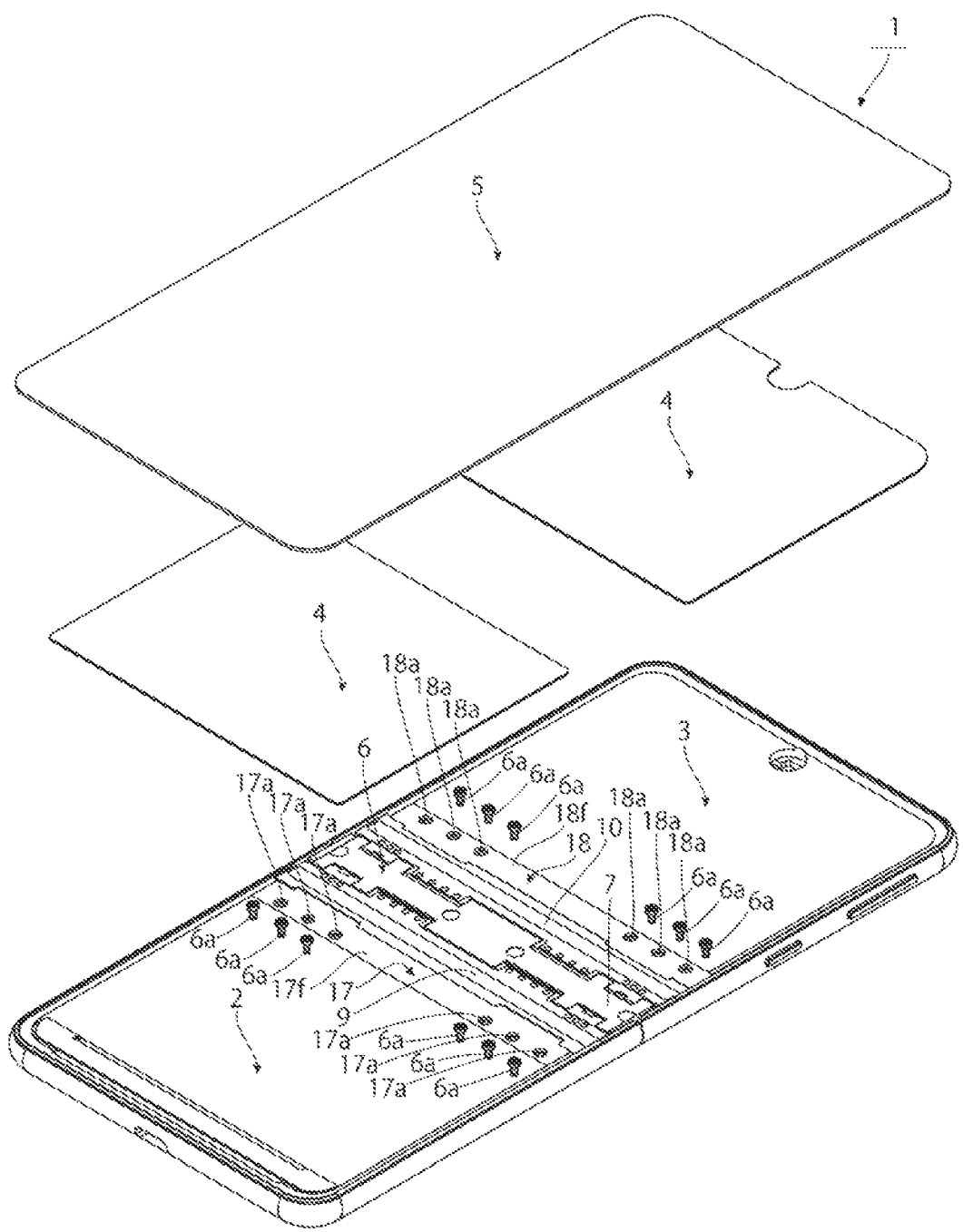
FIG. 4 is a perspective view showing a state of a multiaxial hinge device exposed with a flexible display sheet and a protective sheet having been removed, in an electronic device shown in FIG. 1.

As shown in FIG. 1, a mobile phone 1 is built by attaching a flexible display sheet 5 across respective surfaces of a first casing 2 and a second casing 3. As shown in FIGS. 2, 3, a mobile phone 1 is folded in half by a multiaxial hinge device 6, such that the flexible display sheet 5 comes inside. As shown in FIG. 4, the multiaxial hinge device 6 is provided under the flexible display sheet 5 and a pair of protective sheets 4 to couple a first casing 2 and a second casing 3 such that these are openable and closable relative to each other. The multiaxial hinge device 6 comprises a base plate 7, a front side plate 9, a rear side plate 10, a first attaching plate 17 and a second attaching plate 18, and enables a formation of a space 30 between the front side plate 9 and the rear side plate 10, wherein it is constructed to be able to form a space 30 between the base plate 7 on one hand, the front side plate 9 and the rear side plate 10 on the other, in order to accommodate a folded portion of the flexible display sheet 5 folded when the first casing 2 and the second casing 3 are closed. It is noted that the protective sheets 4 can be also the ones as disclosed in JP Laid-Open Patent Application No. 2020-125841, which supports an entire surface of the flexible display sheet 5.

Figure 5:
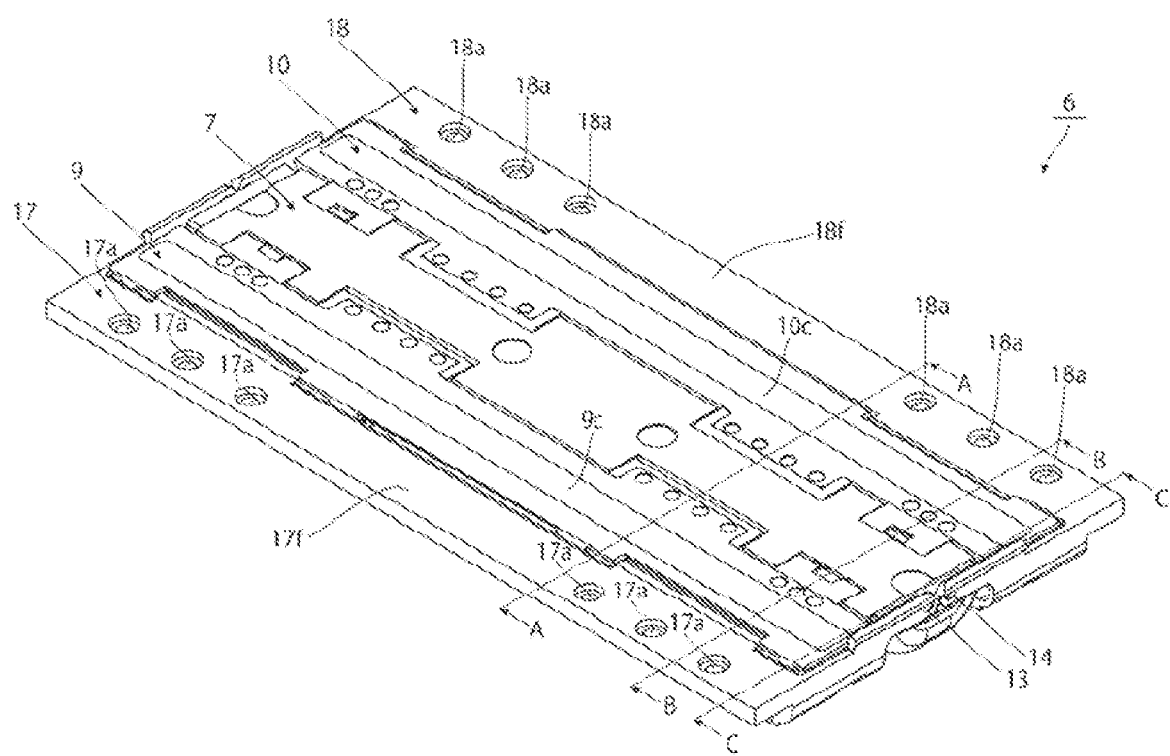
FIG. 5 shows an enlarged perspective view highlighting and enlarging a multiaxial hinge device as shown in FIG. 4.

As shown in FIG. 4, a multiaxial hinge device 6 fixes a free end side 17f of a first attaching plate 17 onto a frame 2a of a first casing 2 by screwing a screw 6a into an attaching hole 17a. Still further, the multiaxial hinge device fixes a free end side 18f of a second attaching plate 18 onto a frame 2a of a second casing 3 by screwing a screw 6a into an attaching hole 18a. As shown in FIG. 5, magnet sheets 9c, 10c are stuck on a front side plate 9 and a rear side plate 10.

Figure 10:
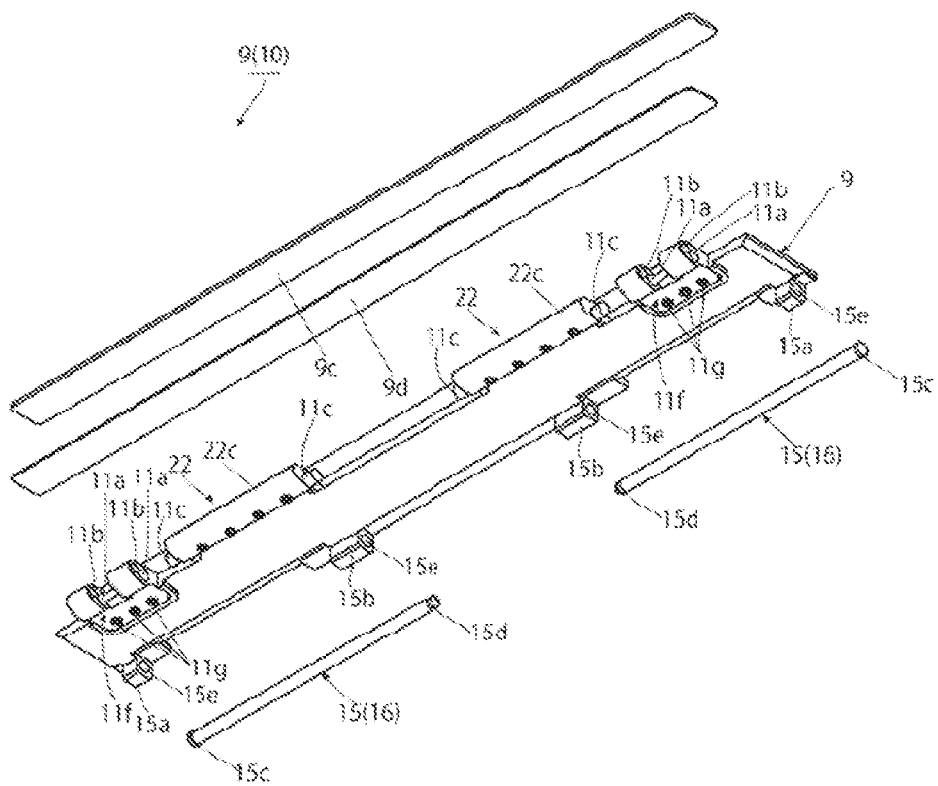
FIG. 10 shows an exploded perspective view of a front side plate including an urging mechanism of a multiaxial hinge device as shown in FIG. 7.

Magnet sheets 9c, 10c are constructed to ensure that a flexible display sheet 5 extends as wide as possible within a space 30 and forms a large R at a folded portion, by adsorbing magnetic layers (not shown) provided on a rear surface of the flexible display sheet 5. As shown in FIG. 10, the magnet sheets 9c, 10c are stuck on a front side plate 9 and a rear side plate 10 using double-sided adhesive tapes 9c (and 10c—not shown).

Next, reference is made to components of a multiaxial hinge device 6. In what follows, a front side plate 9 and a rear side plate 10, and a first attaching plate 17 and a second attaching plate 18 are formed in an identical and longitudinally symmetrical shape. Accordingly, reference is made in detail to the front side plate 9 and the first attaching plate 17 exclusively, while redundant explanations are omitted, given that reference numerals 9, 17 should be substituted by 10, 18 when reference is made to the rear side plate 10 and the second attaching plate 18.

Figure 12A:
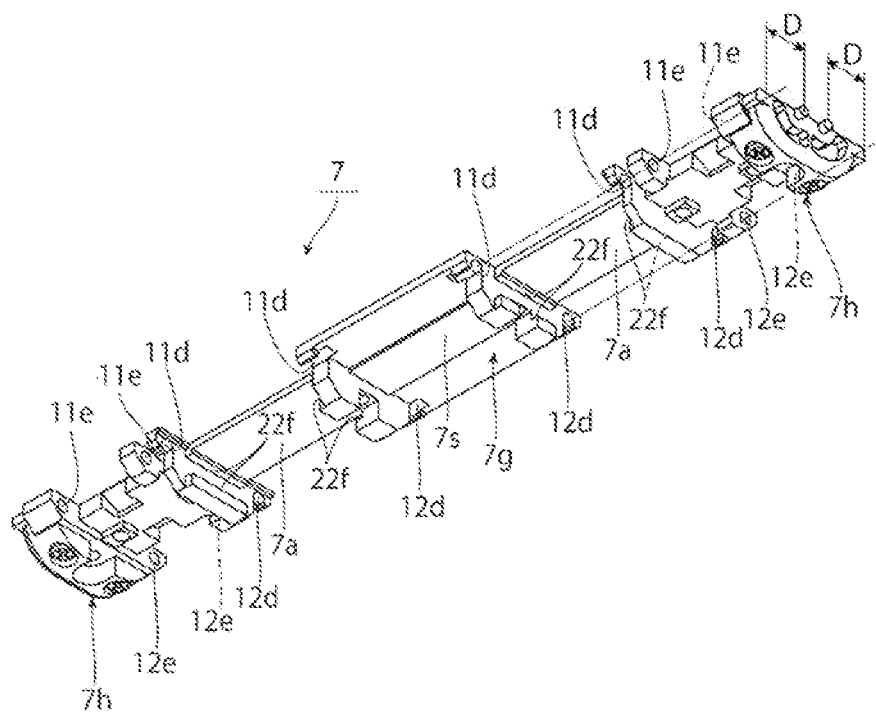
FIGS. 12A and 12B show illustrative views of a structure of a base plate of a multiaxial hinge device as shown in FIG. 7, FIG. 12A being a perspective view and FIG. 12B a plan view.
Figure 12B:
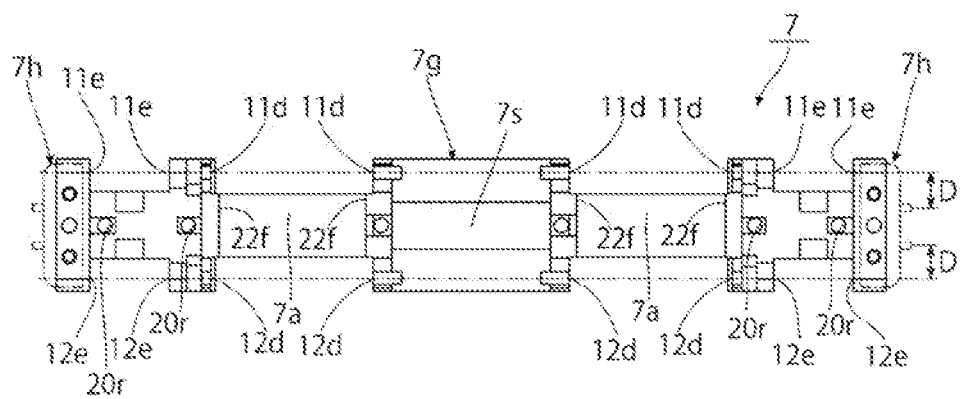
Figure 13A:
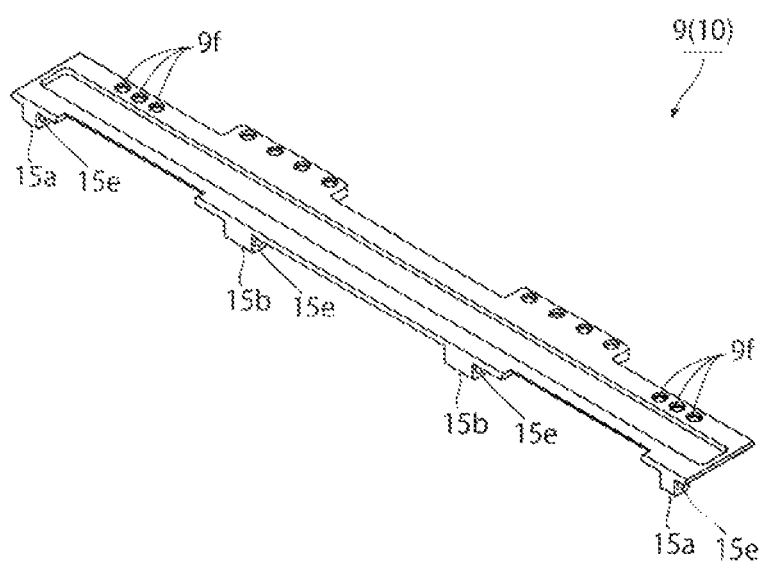
FIGS. 13A and 13B show illustrative views of a structure of a front side plate of a multiaxial hinge device as shown in FIG. 7, FIG. 13A being a perspective view and FIG. 13B a perspective view from another viewpoint.
Figure 13B:
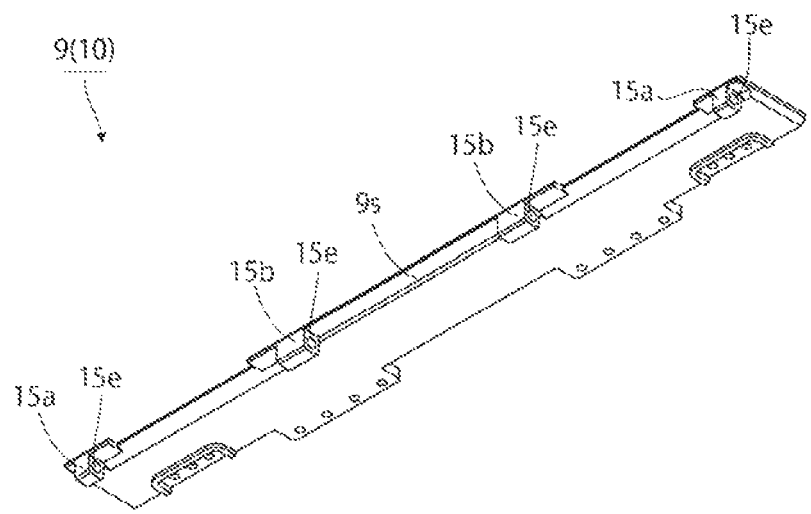

As shown in FIG. 4, a base plate 7 is provided across a right and left direction on respective rear end portions of a first casing 2 and a second casing 3. As shown in FIG. 5, the base plate 7 comprises a first axially supporting pin portion 13 and a second axially supporting pin portion 14 on ends in a right and left direction and on a center in a front and rear direction. As shown in FIG. 12, the base plate 7 comprises a first hinge pin 11 and a second hinge pin 12 with a predetermined distance D outward in the front and rear direction of the first axially supporting pin portion 13 and the second axially supporting pin portion 14.

Figure 7:
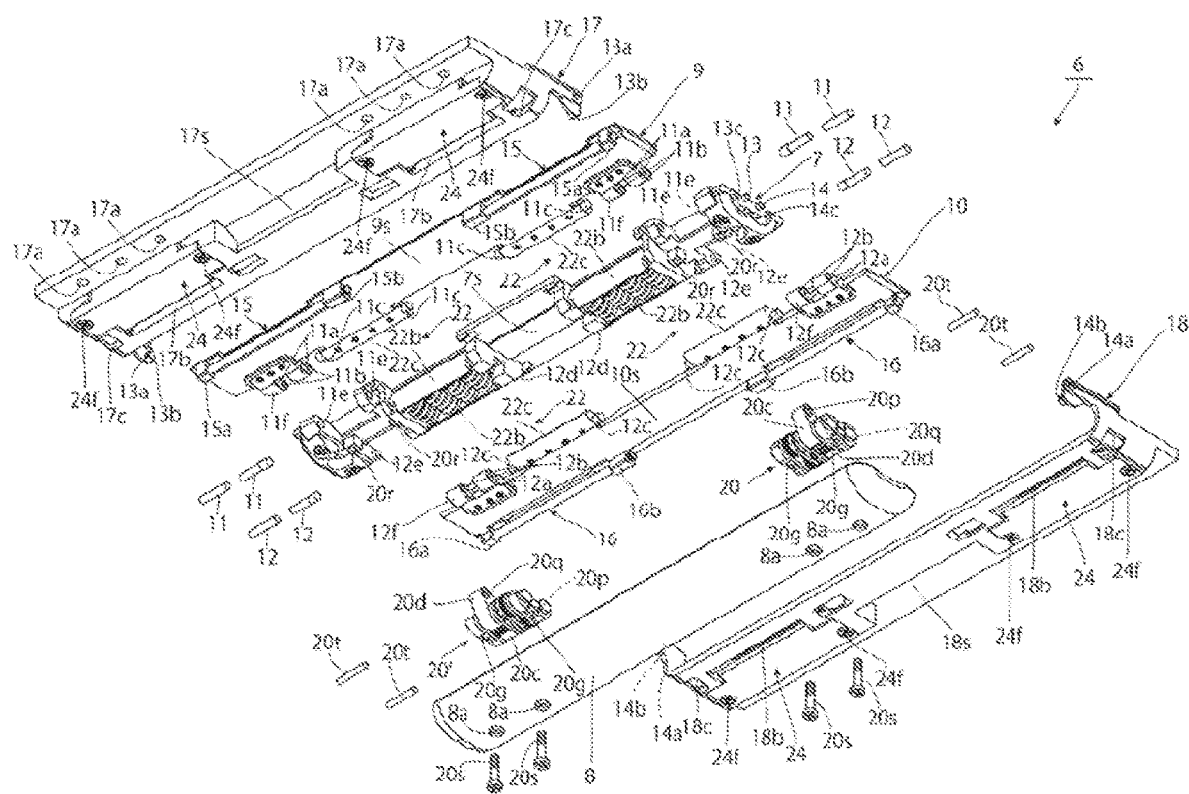
FIG. 7 shows an exploded perspective view of a multiaxial hinge device as shown in FIG. 4.

As shown in FIG. 7, 11, 12, a base plate 7 is a longitudinal molded article made of synthetic resin, which is formed symmetrically on the right and the left, with a cable insertion portion 7s being arranged on the center in a longitudinal direction, and it is constructed with attaching bearing portions 7h, 7h on both ends of a main body 7g. In the base plate 7, a coupling portion for a front side plate 9 using a first hinge pin 11 and bearing portions 11d is provided on a front side in a front and rear direction, and a coupling portion for a rear side plate 10 using a second hinge pin 12 and bearing portions 12d on a rear side in the front and rear direction. The coupling portion for the front side plate 9 is formed to project toward the front side, wherein a pin hole 11e of the first hinge pin 11 is formed. The coupling portion for the rear side plate 10 is formed to project toward the rear side, wherein a pin hole 12e of the first hinge pin 12 is formed. The bearing portions 11d, 11d are fixed onto the base plate 7 on an identical shaft line with the first hinge pins 11, 11 to rotatably support axial portions 11c, 11c of the front side plate 9. The bearing portions 12d, 12d are fixed onto the base plate 7 on an identical shaft line with the second hinge pins 12, 12 to rotatably support axial portions 12c, 12c of the rear side plate 10.

As shown in FIGS. 7, 10, 13, 15, a front side plate 9 and a rear side plate 10 are rotatably attached respectively to a front and a rear sides of a base plate 7 via a first hinge pin 11 and a second hinge pin 12. The front side plate 9 and the rear side plate 10 comprises a third hinge pin 15 and a fourth hinge pin 16 on free end sides of their rotation relative to the base plate 7.

A front side plate 9 and a rear side plate 10 are longitudinal molded articles made of synthetic resin, which is formed symmetrically on the right and the left, with a cable insertion portion 9s being arranged on the center in a longitudinal direction. As shown in FIG. 10, a front side plate 9 is provided by caulking coupling portions 11f by pins 11g. In the front side plate 9, coupling portions 15a, 15b using a third hinge pin 15 are provided. In a rear side plate 10, coupling portions 16a, 16b for a base plate 7 and a second attaching plate 18 are provided as well.

First hinge pins 11, 11 have their one end portion rotatably inserted into pin holes 11a, 11a of the front side plate 9 and their other end portions into pin holes 11e, 11e of a base plate 7. Second hinge pins 12, 12 have their one end portion rotatably inserted into pin holes 12a, 12a of the rear side plate 10 and their other end portions into pin holes 12e, 12e of the base plate 7. Shaft portions 11c, 11c lie on an identical shaft line as the first hinge pins 11, 11 inserted into the pin holes 11a, 11a and are fixed onto the front side plate 9. Shaft portions 12c, 12c lie on an identical shaft line as the second hinge pins 12, 12 inserted into the pin holes 12a, 12a and are fixed onto the rear side plate 10.

Figure 6:
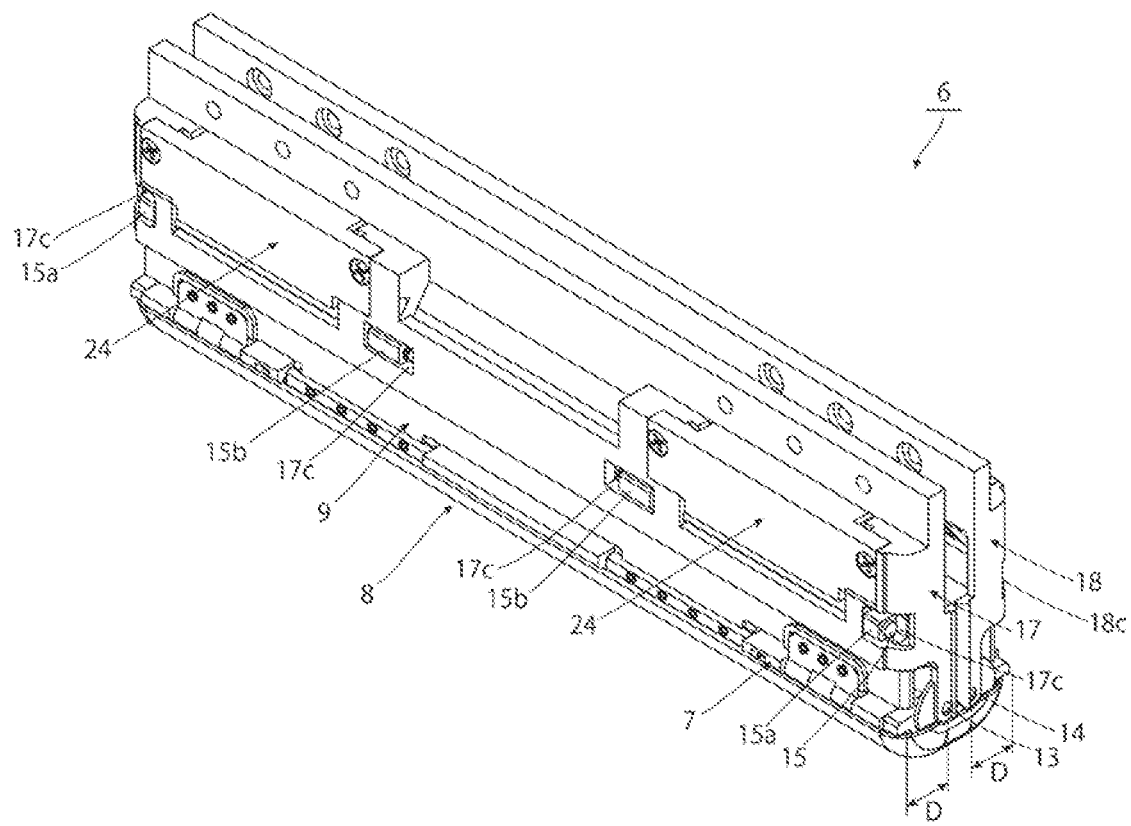
FIG. 6 shows an enlarged perspective view of a multiaxial hinge device as shown in FIG. 4 in a closed state of a first attaching plate and a second attaching plate closed to 0 degree as seen from above.
Figure 15A:
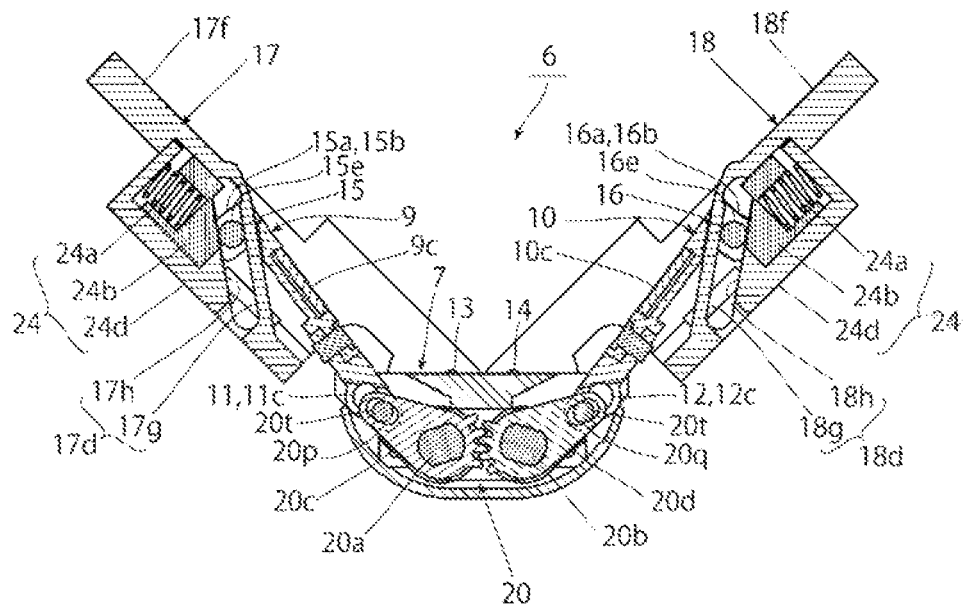
FIGS. 15A and 15B show illustrative views of a first guide portion and a second guide portion respectively formed on a first attaching plate and a second attaching plate of a multiaxial hinge device as shown in FIG. 7, FIG. 15A being a cross section of a synchronous rotation mechanism and FIG. 15B a cross section of an urging mechanism.
Figure 15B:
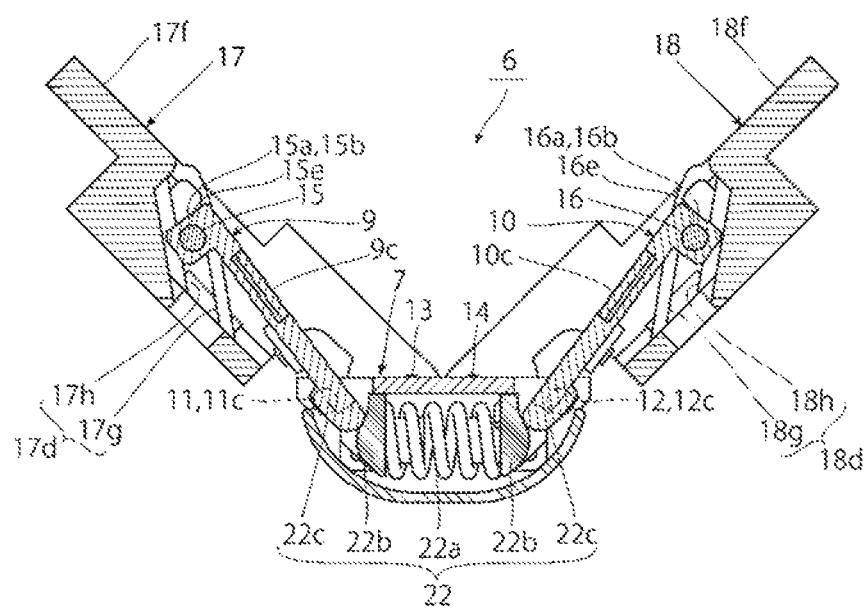

A third hinge pin 15 comprises a flange portion 15c and a ring groove 15d. As shown in FIG. 6, a third hinge pin 15 is assembled by inserting it into coupling portions 15a, 15b of a front side plate 9 from outside through working holes 17c, 17c of a first attaching plate 17 and a guide portion 17d and fitting ring members (not shown) onto ring grooves 15d. In the same manner, a fourth hinge pin 16 is assembled by inserting it into coupling portions 16a, 16b of a rear side plate 10 from outside through working holes 18c of a second attaching plate 18 and a second guide portion (18d; FIG. 15).

As shown in FIGS. 16, 19, a first attaching plate 17 and a second attaching plate 18 are rotatably attached to the base plate 7 via a first axially supporting pin portion 13 and a second axially supporting pin portion 14. In a first attaching plate 17 and a second attaching plate 18, respective rear end portions of a first casing 2 and a second casing 3 are attached to respective free end sides of a base plate 7 attached in a slidably rotatable manner to respective free end sides of a front side plate 9 and a rear side plate 10 via a third hinge pin 15 and a fourth hinge pin 16. A first guide portion 17d and a second guide portion 18d rotatably guide the third hinge pin 15 and the fourth hinge pin 16 while the latter obliquely slide.

Figure 14A:
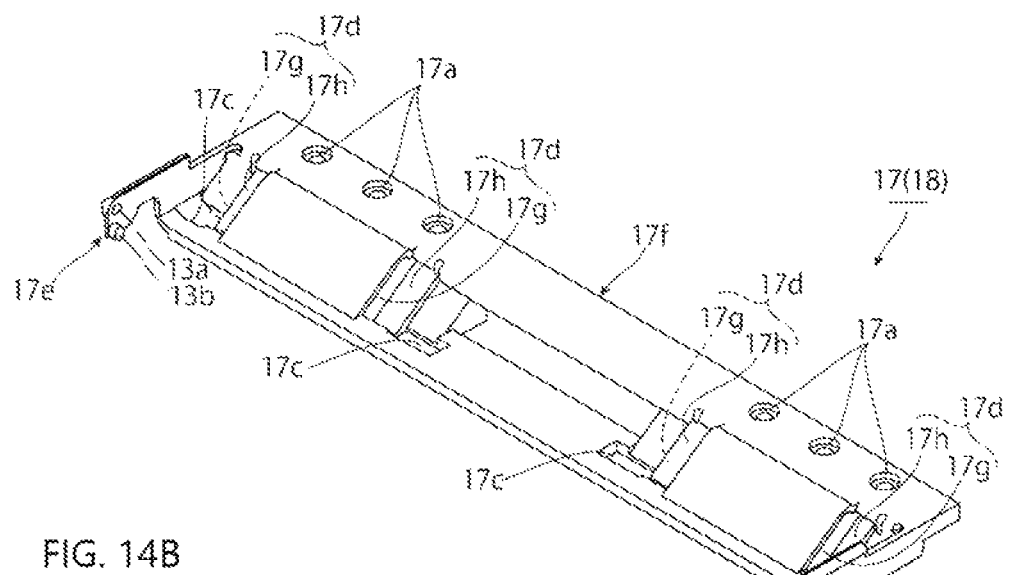
FIGS. 14A and 14B show illustrative views of a first attaching plate of a multiaxial hinge device as shown in FIG. 7, FIG. 14A being a perspective view and FIG. 14B a perspective view from another viewpoint.

As shown in FIGS. 7, 14, a first attaching plate 17 and a second attaching plate 18 are longitudinal molded articles made of synthetic resin, which are formed symmetrically on the right and the left, with cable insertion portions 17s, 18s being arranged on the center in a longitudinal direction. In a first attaching plate 17, a coupling portion (hole 13a) for a base plate 7 using a first axially supporting pin portion 13 is provided on a tip side of an arm portion 17e on both ends in a longitudinal direction, and a coupling portion (first guide portion 17d) for a front side plate 9 using a third hinge pin 15 inside. In a second attaching plate 18, a coupling portion (hole 14a) for a base plate 7 using a first axially supporting pin portion 14 is provided as well on a tip side of an arm portion 18e on both ends in a longitudinal direction, and a coupling portion (second guide portion 18d) for a front side plate 10 using a fourth hinge pin 16 inside.

As shown in FIGS. 14, 15, a guide portion 17d for a first attaching plate 17 is formed by edges facing each other between an inner slope 17g in a right and left direction and both slopes 17h, 17h outside that to guide a lateral surface of a third hinge pin 15. In the same manner, an inclined second guide portions 18d, 18d to guide a fourth hinge pin 16 is formed on a second attaching plate 18. As shown in FIG. 16, a third hinge pin 15 is guided by the guide portion 17d as accompanied by a rotation of a front side plate 9 slides obliquely against the first attaching plate 17 and retract a free end side of the front side plate 9 obliquely from a plane of the first attaching plate 17. A fourth hinge pin 16 is guided by the second guide portion 18d as accompanied by a rotation of a rear side plate 10 slides obliquely against the second attaching plate 18 and retract a free end side of the rear side plate 10 obliquely from a plane of the second attaching plate 18. And then, as shown in FIG. 3, a space 30 accommodating a folded portion of a flexible display sheet 5 is formed, as accompanied by a rotation of the front side plate 9 and the rear side plate 10. As accompanied by a movement of a first casing 2 and a second casing 3 from their opened state to the closed state via a synchronous rotation mechanism 20, the space 30 symmetrical on the right and the left sandwiched between the front side plate 9 and the rear side plate 10 with a base plate 7 being a bottom surface is formed.

A base cover 8 covers a synchronous rotation mechanism 20, a drawing mechanism 21 and an urging mechanism 22 installed below a base plate 7, and has a boat-like shape curved on a transverse surface. The base cover 8 is attached to the base plate 7 by inserting screws 20s, 20s into holes 8a, 8a and holes 20g, 20g of the synchronous rotation mechanism 20 and fastening the screws to female screws of fixing portions 20r, 20r of the base plate 7. The synchronous rotation mechanism 20 is fixed to the base plate 7 to be integral with the base cover 8.

Synchronous Rotation Mechanism

Next, reference is made to a structure of a synchronous rotation mechanism 20, 20'. FIG. 16 shows a cross section in line B-B in FIG. 5. As shown in FIG. 16, the synchronous rotation mechanism 20 synchronously rotate a front side plate 9 and a rear side plate 10 as accompanied by opening and closing of a first casing 2 and a second casing 3. The synchronous rotation mechanism 20 is provided on a base plate 7 via a third axially supporting pin portion 20a and a fourth axially supporting pin portion 20b. The synchronous rotation mechanism 20 is formed by meshing a first lever gear 20c and a second lever gear 20d, and when one of the front side plate 9 and the rear side plate 10 is rotated, the other is symmetrically rotated via a meshing of the first lever gear 20c and the second lever gear 20d.

A first lever gear 20c is rotatably attached to a base plate 7 via a third axially supporting pin portion 20a, and driven by a rotation of a front side plate 9 via a first hinge pin. A second lever gear 20d is rotatably attached to a base plate 7 via a fourth axially supporting pin portion 20b, and driven by a rotation of a rear side plate 10 via a second hinge pin 12.

Figure 8:
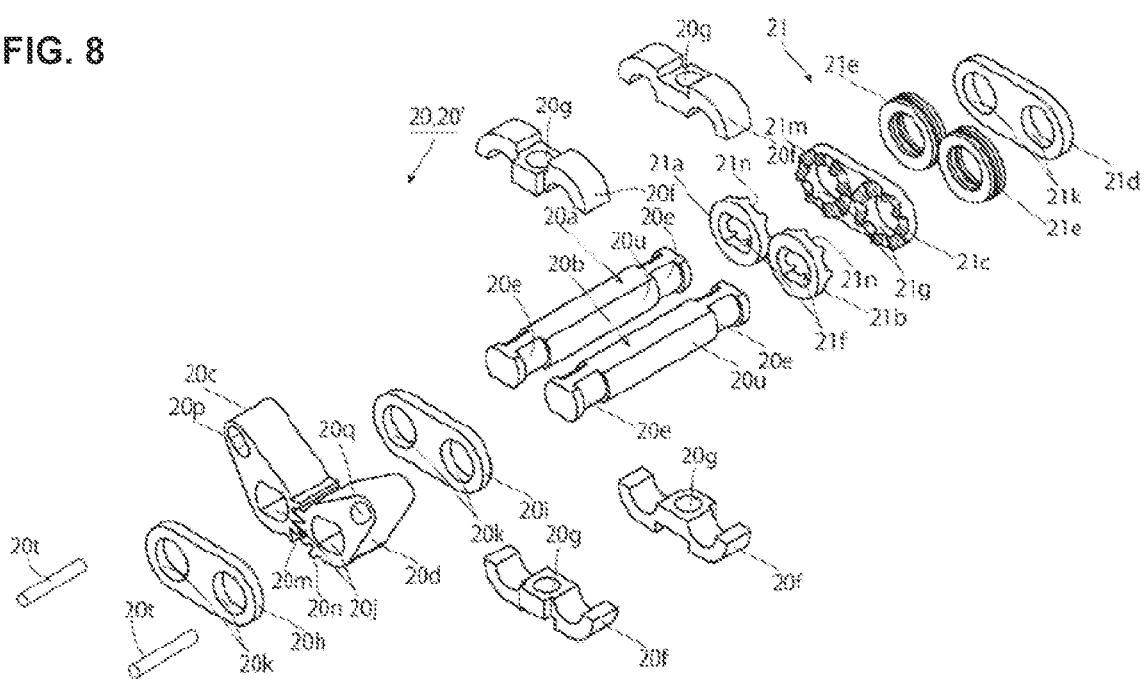
FIG. 8 shows an exploded perspective view of a synchronous rotation mechanism of a multiaxial hinge device as shown in FIG. 7.

As shown in FIG. 8, a third axially supporting pin portion 20a and a fourth axially supporting pin portion 20b are sandwiched between bearing members 20f, 20f and bearing members 20f, 20f and thus rotatably attached to a base plate 7. The bearing members 20f, 20f, 20f, 20f are restrained by stepped grooves 20e, 20e, 20e, 20e of the third axially supporting pin portion 20a and the fourth axially supporting pin portion 20b. Flat shaft portions 20u, 20u of the third axially supporting pin portion 20a and the fourth axially supporting pin portion 20b are rotatably supported by round holes 20k, 20k of spacers 20h, 20i. The flat shaft portions 20u, 20u restrain rotations of a first lever gear 20c and a second lever gear 20d.

As shown in FIG. 16, a first lever gear 20c and a second lever gear 20d are interlocked with a front side plate 9 and a rear side plate 10 via a pair of pins 20t, 20t. The pair of pins 20t, 20t have one ends fixed to pin holes 11b, 12b and other ends held by oval holes 20q, 20q of a first lever gear 20c and a second lever gear 20d. Therefore, when the front side plate 9 is rotated relative to a base plate 7, the drive is transmitted from the pin 20t on the front side plate 9 to the pin 20t on the rear side plate 10 via a meshing of the front side plate 9 and the rear side plate 10, the rear side plate 10 is symmetrically rotated. Inversely, when the rear side plate 10 is rotated relative to a base plate 7, the drive is transmitted in a reverse direction, so that the front side plate 9 is rotated. In this manner, the synchronous rotation mechanism 20 symmetrically rotates a first attaching plate 17 and a second attaching plate 18. The synchronous rotation mechanism 20 is realized in a relatively simple structure with a small number of parts, which can make a multiaxial hinge device 6 thinner.

In the meantime, as shown in FIGS. 7, 8, the synchronous rotation mechanism 20 and the synchronous rotation mechanism 20' are constructed to be identical, with their respective multiaxial hinge devices 6 having opposite orientations in a right and left direction, and being symmetrically arranged. Therefore, in the synchronous rotation mechanism 20', a relationship between a first lever gear 20c and a second lever gear 20d and that between a front side plate 9 and a rear side plate 10 are opposite to those in the synchronous rotation mechanism 20. In other words, in the synchronous rotation mechanism 20', the first lever gear 20c is interlocked with the rear side plate 10 via a pin 20t, while the second lever gear 20d with the front side plate 9 via a pin 20t.

As shown in FIG. 8, a synchronous rotation mechanism 20 is provided with a drawing mechanism 21. The drawing mechanism 21 draws a front side plate 9 and a rear side plate 10 into a closed state and an opened state to stop their rotation. The drawing mechanism 21 comprises a fixing cam plate 21c provided by rotatably linking a third axially supporting pin portion 20a and a fourth axially supporting pin portion 20b, a pair of rotary cam plates 21b, 21b provided on the third axially supporting pin portion 20a and the fourth axially supporting pin portion 20b by locking their respective rotations by making fixing cam plate 21c and corrugated surfaces 21m, 21n to overlap each other, and a compressing spring member 21e, 21e for compressing an overlapping area of the fixing cam plate 21c and the rotary cam plates 21a, 21b.

Flat shaft portions 20u, 20u of the third axially supporting pin portion 20a and the fourth axially supporting pin portion 20b are respectively rotatably supported by round holes 21k, 21g of spacers 21d and the fixing cam plate 21c. The flat shaft portions 20u, 20u of the third axially supporting pin portion 20a and the fourth axially supporting pin portion 20b restrain rotations of the rotary cam plates 21a, 21b via flat holes 21f, 21f. A compressing spring member 21e is an aggregate of washer springs and constructed by placing four bevel-shaped washer springs one upon the other, in alternating orientations.

Figure 20A:
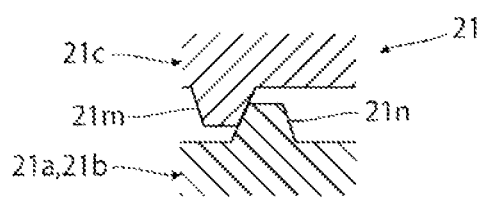
FIGS. 20A to 20D show conceptual schematic views of an operation of a drawing mechanism as shown in FIG. 8, FIG. 20A showing a closed state when casings are closed to 0 degree, FIG. 20B a state of an opening angle close to 0 degree, FIG. 20C a state of an opening angle close to 180 degrees, and FIG. 20D an opened state when they are opened 180 degrees.
Figure 20B:
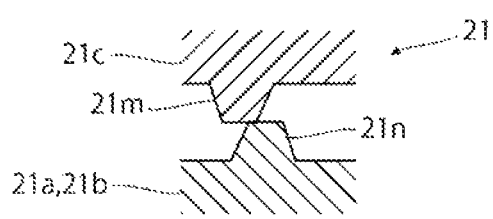
Figure 20C:
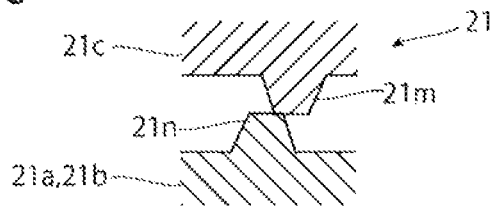
Figure 20D:
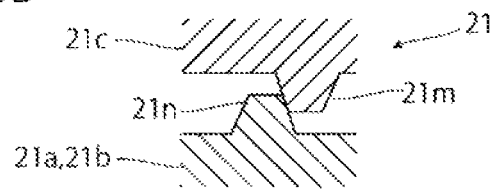

As shown in FIG. 16, a third axially supporting pin portion 20a and a fourth axially supporting pin portion 20b rotate respectively about 30 to 40 degrees from a closed state to an opened state of a multiaxial hinge device 6. As shown in FIG. 20, in a drawing mechanism 21, corrugated surface 21m, 21n of rotary cam plates 21a, 21b meshed with a fixing cam plate 21c as accompanied by a rotation of a third axially supporting pin portion 20a and a fourth axially supporting pin portion 20b contract and expand the compressing spring members 21e. The drawing mechanism 21 draws a first attaching plate 17 and a second attaching plate 18 into an angular position at which the compressing spring members 21e are expanded to stop them (FIGS. 20A, 20D). Then, in a predetermined angular range between both ends of this angular range, the compressing spring members 21e is compressed constantly so that the fixing cam plate 21c and the rotary cam plates 21a, 21b generate only friction (FIGS. 20B, 20C), a multiaxial hinge device 6 can stop at any opening angular position, which is a so-called free stop state. Therefore, the drawing mechanism 21 makes the closed state and the opened state of a multiaxial hinge device 6 stable and enhances an operability of the multiaxial hinge device 6.

Urging Mechanism

Figure 17A:
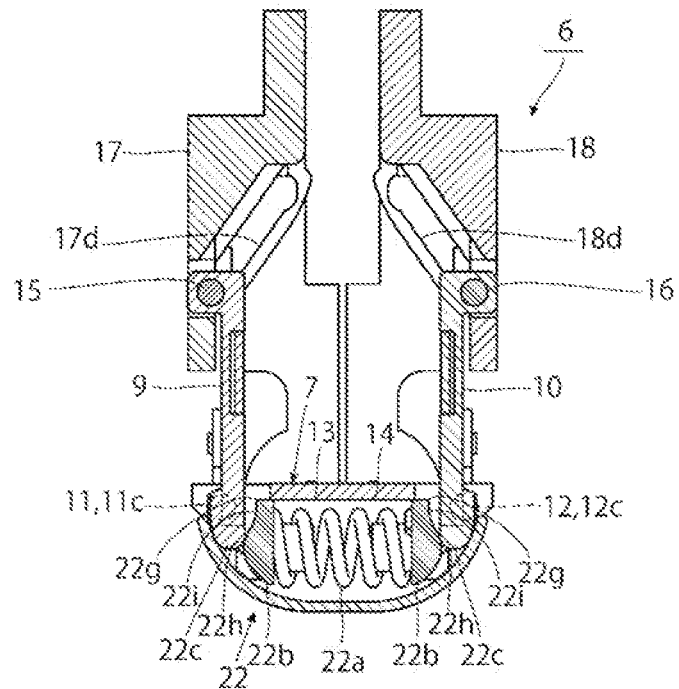
FIGS. 17A to 17C show illustrative views of an operation of an urging mechanism of a multiaxial hinge device as shown in FIG. 7, FIG. 17A showing a closed state when casings are closed to 0 degree, FIG. 17B a state when they are opened 90 degrees, and FIG. 17C an opened state when they are opened 180 degrees.
Figure 17B:
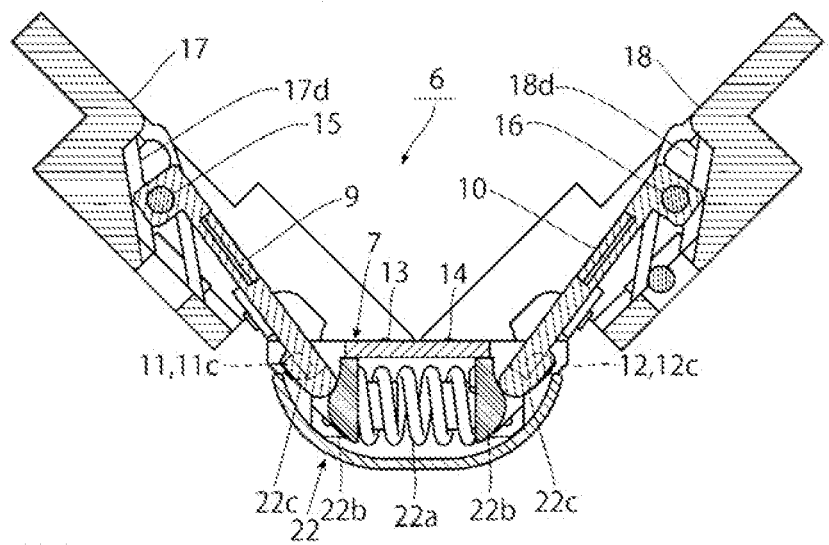

Next, reference is made to a structure of an urging mechanism 22. FIG. 17 shows a cross section in line A-A in FIG. 5. As shown in FIG. 17, an urging mechanism 22 urges a front side plate 9 and a rear side plate 10 in a closing direction and can maintain a closed state and the opened state of the front side plate 9 and the rear side plate 10. The urging mechanism 22 comprises compression coil springs 22a compressed in a front and rear direction along a base plate 7, a pair of cam follower portions 22c provided on the front side plate 9 and the rear side plate 10 to slide a slide cam 22b as accompanied by rotations via a first hinge pin 11 and a second hinge pin 12 and to compress the compression coil springs 22a in the front and rear direction.

Figure 11:
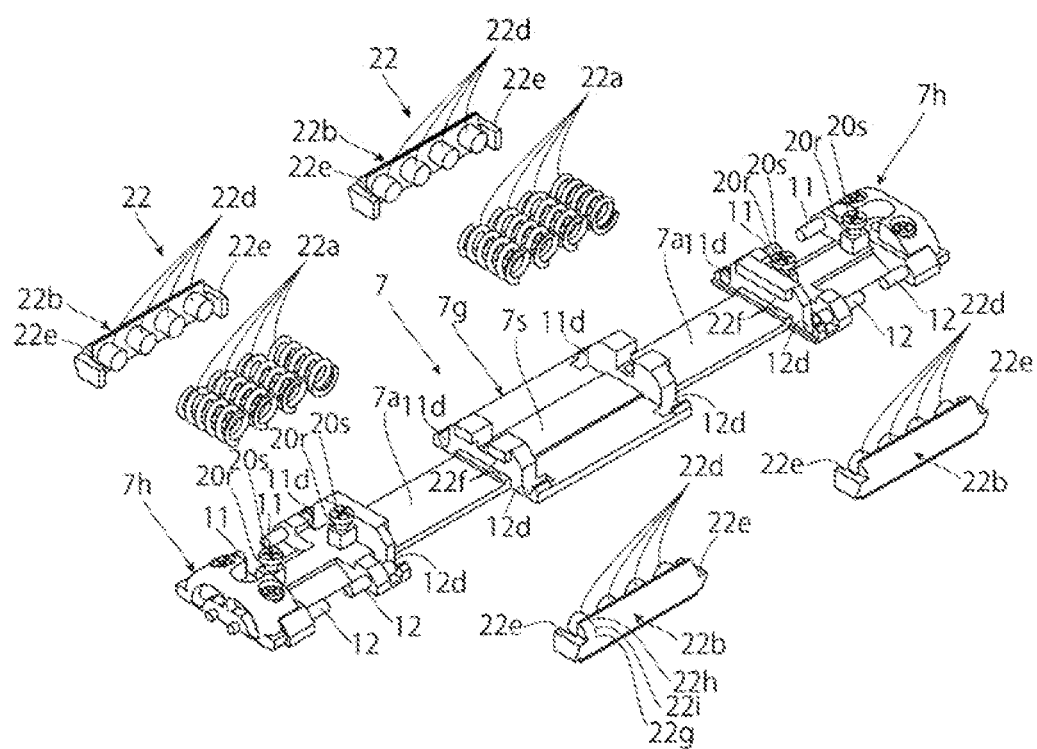
FIG. 11 shows an exploded perspective view of a base plate including an urging mechanism of a multiaxial hinge device as shown in FIG. 7.

As shown in FIG. 11, holding spaces 7a, 7a for an urging mechanism 22 are provided on a lower surface of a base plate 7. A slide cam 22b comprises a plurality of projections 22d, 22d, 22d, 22d for arranging compression coil springs 22a, 22a, 22a, 22a in a right and left direction to hold them. The base plate 7 comprises guide portions 22f, 22f for holding a pair of slide cams 22b, 22b outside the arranged compression coil springs 22a, 22a, 22a, 22a so that the slide cams are slidable in a front and rear direction. Therefore, the compression coil springs 22a are supported by the base plate 7 via the slide cams 22b.

As shown in FIG. 17, in an urging mechanism 22, its cam follower portions 22c protrude around a first hinge pin 11 and a second hinge pin 12 having a lever-like shape on an opposite side to a third hinge pin 15 and a fourth hinge pin 16. The cam follower portions 22c, 22c are provided by fixing other members of low wear material to a front side plate 9 and a rear side plate 10. The cam follower portions 22c, 22c rub slide cams 22b, 22b and presses the slide cams 22b, 22b as accompanied by rotations of the front side plate 9 and a rear side plate 10 via the first hinge pin 11 and the second hinge pin 12 to move them in the front and rear direction.

A predetermined cam curve 22i or a predetermined drawing curve is set for slide cams 22b, 22b. As shown in FIG. 7A, a convex portion 22g turning a multiaxial hinge device 6 into an opened state, a concave portion 22h turning the multiaxial hinge device 6 into a closed state are provided on the slide cams 22b, and a cam curve 22i for linking them both (22g, 22h) is set for the latter. Cam follower portions 22c, 22c move along the cam curve 22i from one rubbing point to another, and are driven outward with a force depending on the cam curve 22i. It is noted that a cam curve for the slide cams 22b, 22b is not limited to that described herein.

As shown in FIG. 7B, from a closed state in which a first attaching plate 17 and a second attaching plate 18 are closed to 0 degree to a state in which they are opened 90 degrees, a cam curve 22i is set such that slide cams 22b, 22b press cam follower portions 22c, 22c outward to move them. Therefore, the first attaching plate 17 and the second attaching plate 18 are opened against an urging force of a plurality of compression coil springs 22a, and when hands are off, a multiaxial hinge device 6 attempts to restore its closed state in this angular range.

Figure 17C:
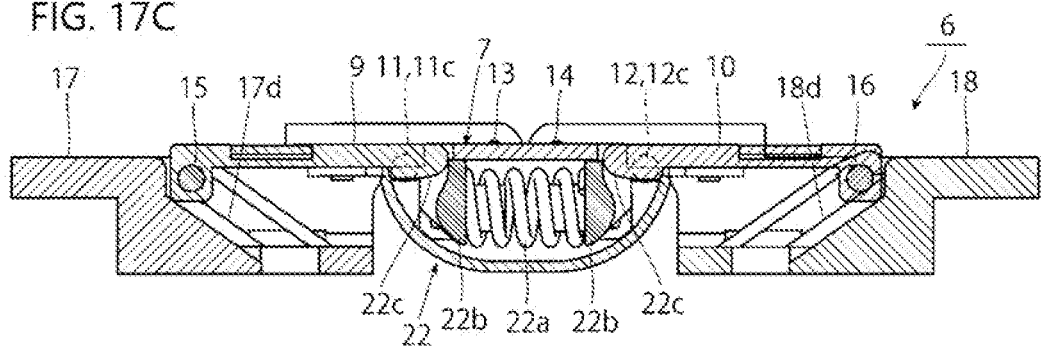

As shown in FIG. 17C, when it gets closer to an opened state in which the first attaching plate 17 and the second attaching plate 18 are opened 180 degrees, an urging force of the compression coil springs 22a has a stronger tendency to press shaft portions 11c, 12c outward and a moment in a closing direction is smaller. As a result, a force required to open the first attaching plate 17 and the second attaching plate 18 is reduced, the first attaching plate 17 and the second attaching plate 18 are urged to the opened state in which they are opened 180 degrees, and the opened state of 180 degrees is automatically maintained.

It is noted that a first attaching plate 17 and a second attaching plate 18 are restrained to an angle from 0 degree to 180 degrees by means of an engaging structure between a base plate 7 on one hand, and the first attaching plate 17 and the second attaching plate 18 on the other. As shown in FIG. 19, guide pins 13b, 14b provided on the first attaching plate 17 and the second attaching plate 18 are guided arc-shaped guide grooves 13c, 14c provided on the base plate 7, thus the first attaching plate 17 and the second attaching plate 18 are positioned in a linear shape in an opened state, and the first attaching plate 17 and the second attaching plate 18 are positioned in parallel in a closed state.

Accordingly, an urging mechanism 22 can urge a first casing 2 and a second casing 3 in a wider angular range of the first casing 2 and the second casing 3 than a common drawing mechanism or a drawing mechanism 21 as described above, and provide a highly operable multiaxial hinge device 6 capable of stably holding the first casing 2 and the second casing 3 both in the closed state and in the opened state. Still further, the urging mechanism 22 restrains a first attaching plate 17 and a second attaching plate 18 to the closed state and in the opened state guide grooves 13c, 14c provided on end surfaces in a right and left direction of a base plate 7, which can enhance a position accuracy of the first casing 2 and the second casing 3 as well as a rigidity strength of the multiaxial hinge device 6.

Tension Adjusting Mechanism

Next, reference is made to a structure of a tension adjusting mechanism 24. FIG. 18 shows a part of a lateral view along a front and rear direction in a cross section in line B-B of FIG. 5. FIG. 19 shows a cross section in line C-C in FIG. 5. The tension adjusting mechanism 24 moves at least one of a first attaching plate 17 and a second attaching plate 18, of which an opened state is maintained by an urging mechanism 22, in the front and rear direction depending on a tension of a flexible display sheet 5 to adjust the tension of the flexible display sheet 5. The tension adjusting mechanism 24 comprises a slider 24b abutting against at least one of a third hinge pin 15 and a fourth hinge pin 16 to slide in the front and rear direction, and compression coil springs 24a provided between at least one of the first attaching plate 17 and the second attaching plate 18 and the slider 24b.

A guide pin 13b is fixed to an arm portion 17e of a first attaching plate 17, and a guide pin 14b is fixed to an arm portion 18e of a second attaching plate 18. When the first attaching plate 17 and the second attaching plate 18 is symmetrically rotated about a first axially supporting pin portion 13 and a second axially supporting pin portion 14, the guide pin 13b is rotated integral with the first attaching plate 17, and the guide pin 14b with the second attaching plate 18.

Figure 19A:
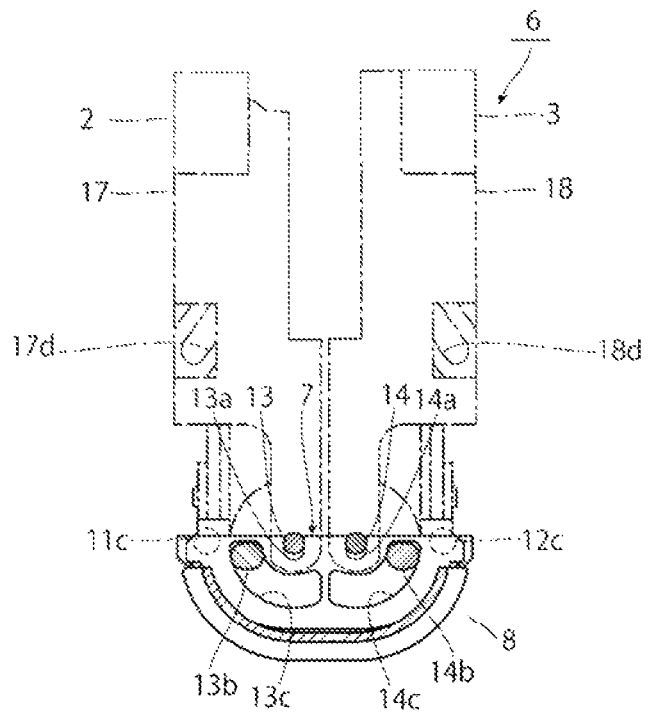
FIGS. 19A to 19C show illustrative views showing that a first attaching plate and a second attaching plate are provided to stop movement in a closed state of a multiaxial hinge device as shown in FIG. 7 being closed to 0 degree as well as when it is opened 90 degrees, FIG. 18A showing its closed state being closed to 0, FIG. 18B a state in which it is opened 90 degrees, and FIG. 18C an opened state in which it is opened to 180 degrees.
Figure 19B:
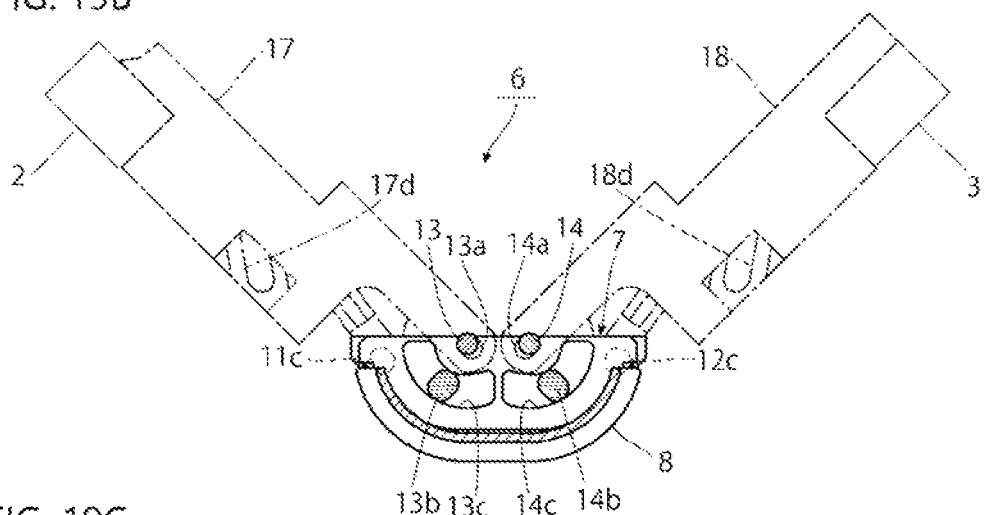
Figure 19C:
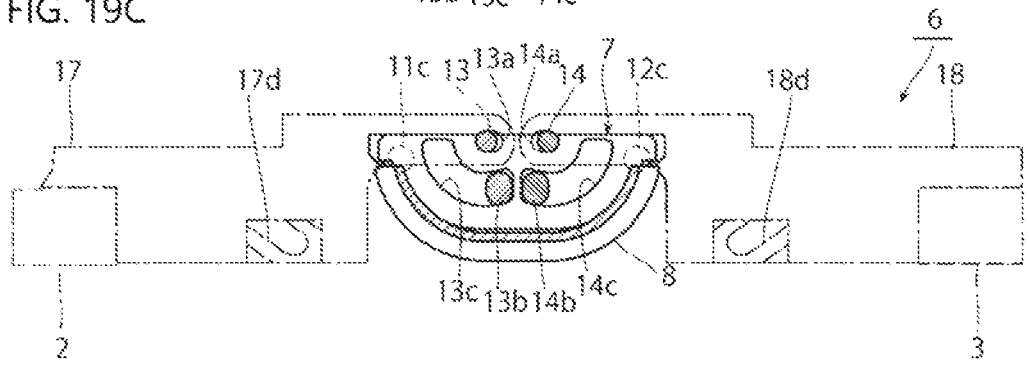

In a closed state shown in FIG. 19A and in a state shown in FIG. 19B in which both casings are opened 90 degrees, guide pins 13b, 14b are restrained across an entire width of guide grooves 13c, 14c, so that there is no room for movement of the first axially supporting pin portion 13 and the second axially supporting pin portion 14 in oval holes 13a, 14a. However, in an opened state shown in FIG. 19C in which the both casings are opened 180 degrees, a direction in which the guide pins 13b, 14b are movable along the guide grooves 13c, 14c corresponds to a longitudinal direction of the oval holes 13a, 14a. In this manner, there is a room for movement in a longitudinal direction of an oval hole 13a on a first attaching plate 17, as well as the one for movement in a longitudinal direction of an oval hole 14a on a second attaching plate 18. Tension adjusting mechanisms 24, 24 make use of these rooms for movement of the first attaching plate 17 and the second attaching plate 18 to adjust a tension of a flexible display sheet 5 stretched between the first attaching plate 17 and the second attaching plate 18.

Figure 18A:
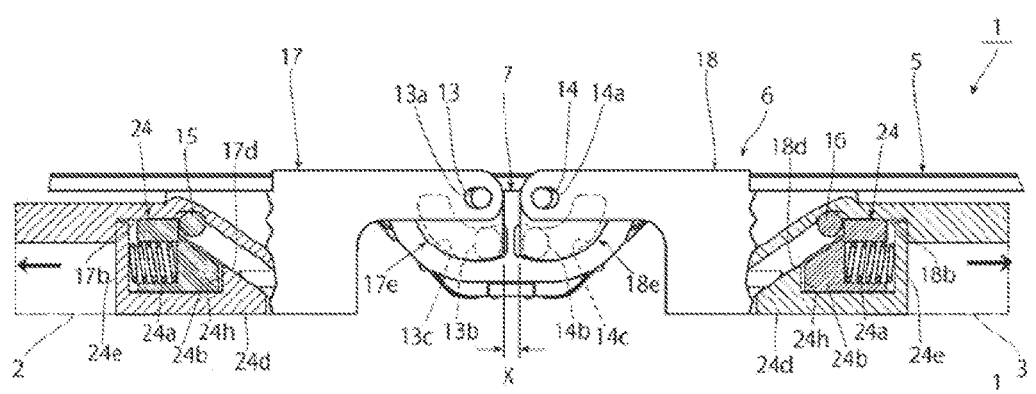
FIGS. 18A and 18B show illustrative views showing that a first attaching plate and a second attaching plate are provided to be movable outward and inward in a front and a rear direction when a multiaxial hinge device as shown in FIG. 7 is opened 180 degrees, FIG. 18A showing a state of the first attaching plate and the second attaching plate having moved outward in a front and a rear direction, and FIG. 18B a state of the first attaching plate and the second attaching plate having moved inward in a front and a rear direction.
Figure 18B:
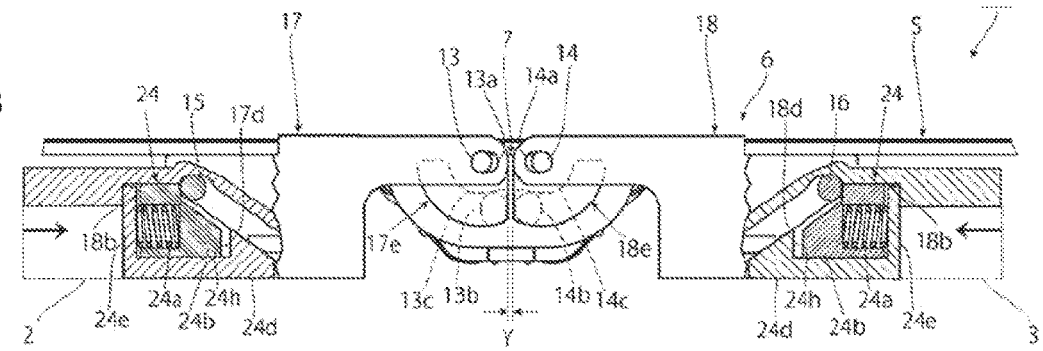

As shown in FIG. 18A, a first attaching plate 17 and a second attaching plate 18 are movable in a front and rear direction relative to a first axially supporting pin portion 13 and a second axially supporting pin portion 14. When the first attaching plate 17 and the second attaching plate 18 move outward, a distance between the first attaching plate 17 and the second attaching plate 18 is wider, X. When the first attaching plate 17 and the second attaching plate 18 move inward as shown in FIG. 18B, a distance between the first attaching plate 17 and the second attaching plate 18 is narrower, Y. Tension adjusting mechanisms 24 make use of these room for movement of the first attaching plate 17 and the second attaching plate 18 to elastically support a flexible display sheet 5 provided across the first attaching plate 17 and the second attaching plate 18 in a tension direction.

Figure 9:
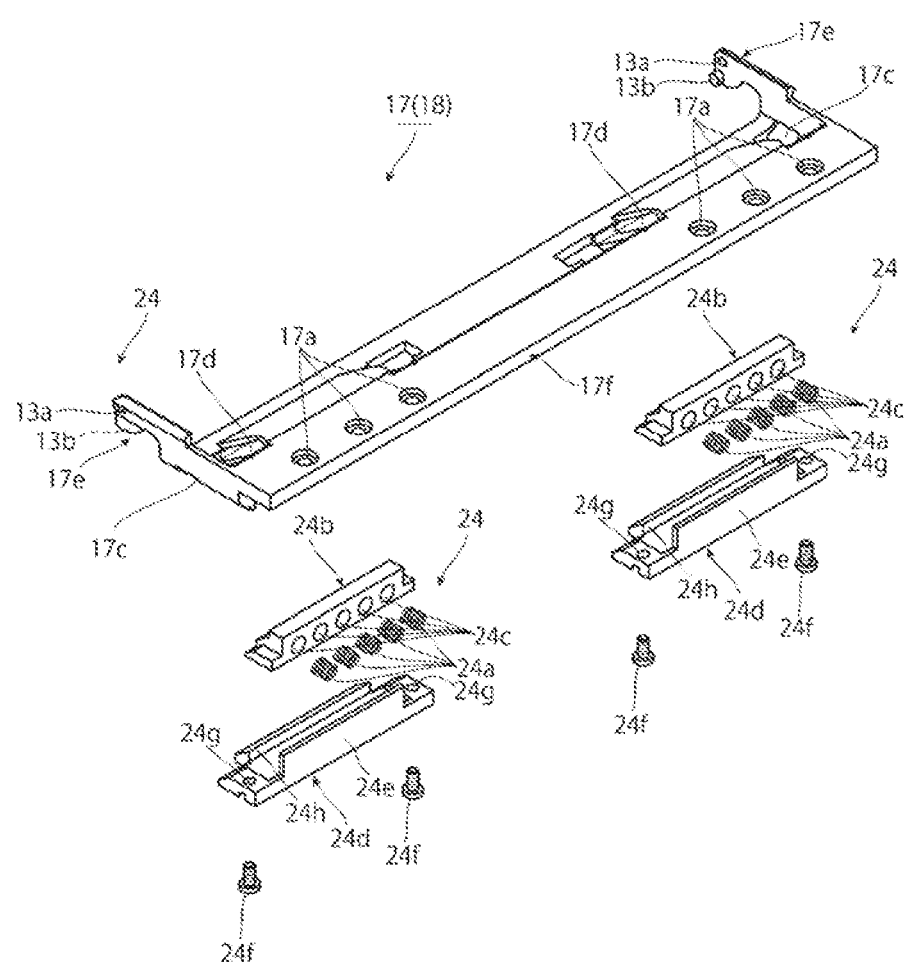
FIG. 9 shows an exploded perspective view of a first attaching plate including a tension adjusting mechanism of a multiaxial hinge device as shown in FIG. 7.
Figure 14B:
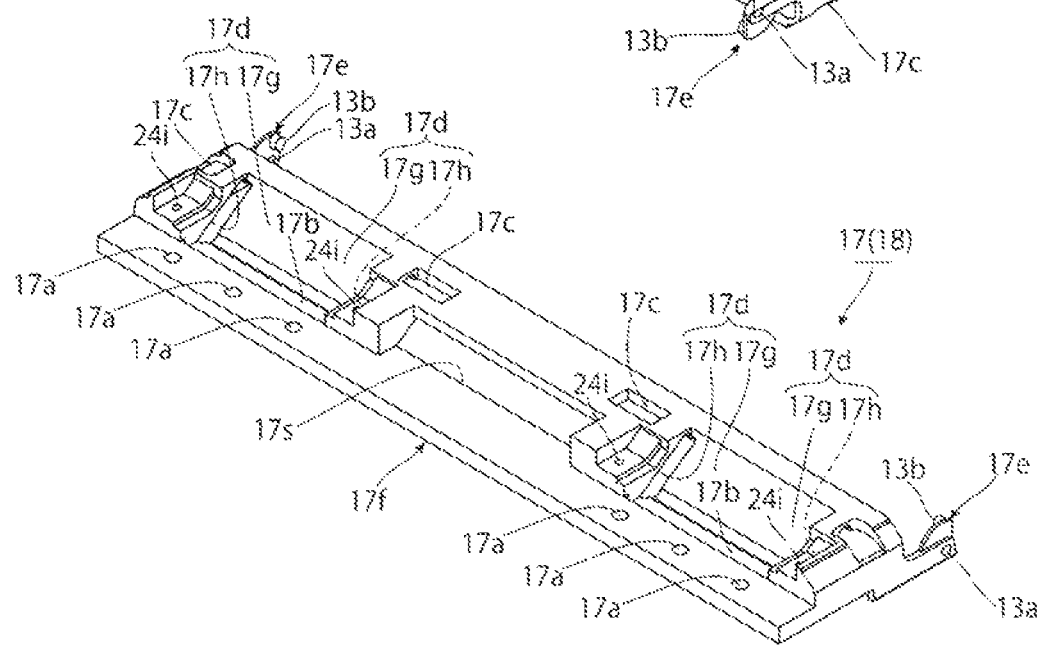

Tension adjusting mechanisms 24 shown in FIG. 9 are attached concave spots 17b, 17b of a lower surface of a first attaching plate 17 shown in FIG. 14B. The tension adjusting mechanisms 24 are assembled by inserting screws 24f, 24f into holes 21g of a slider guide 24d and fastening them to female screws of the lower surface of the first attaching plate 17 shown in FIG. 14B. The slider guide 24d can hold positions of sliders 24b respectively with compression coil springs 24a being interposed, between a bumped portion 24h and a bumped portion 24e for the compression coil springs 24a. In the same manner, tension adjusting mechanisms 24, 24 are attached to concave spots 18b, 18b of a lower surface of a second attaching plate 18.

Figure 16A:
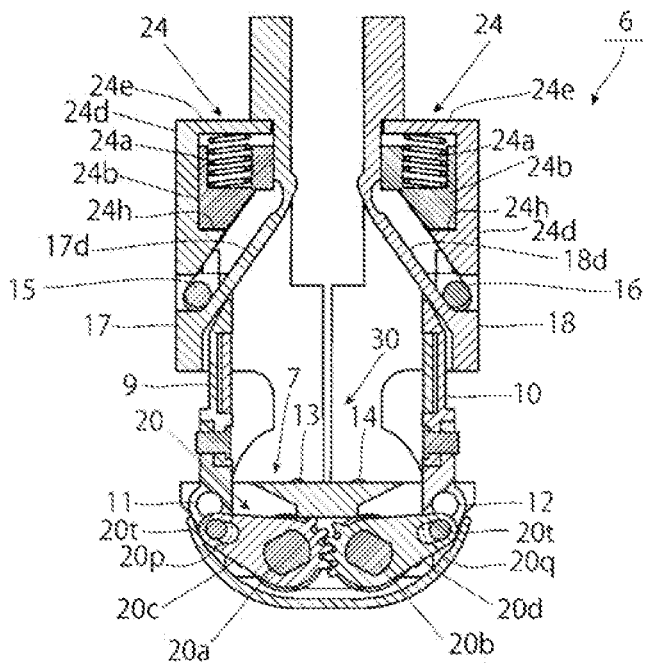
FIGS. 16A to 16C show illustrative views of operations of a synchronous rotation mechanism and a tension adjusting mechanism of a multiaxial hinge device as shown in FIG. 7, FIG. 16A showing a closed state when casings are closed to 0 degree, FIG. 16B a state when they are opened 90 degrees, and FIG. 16C an opened state when they are opened 180 degrees.
Figure 16B:
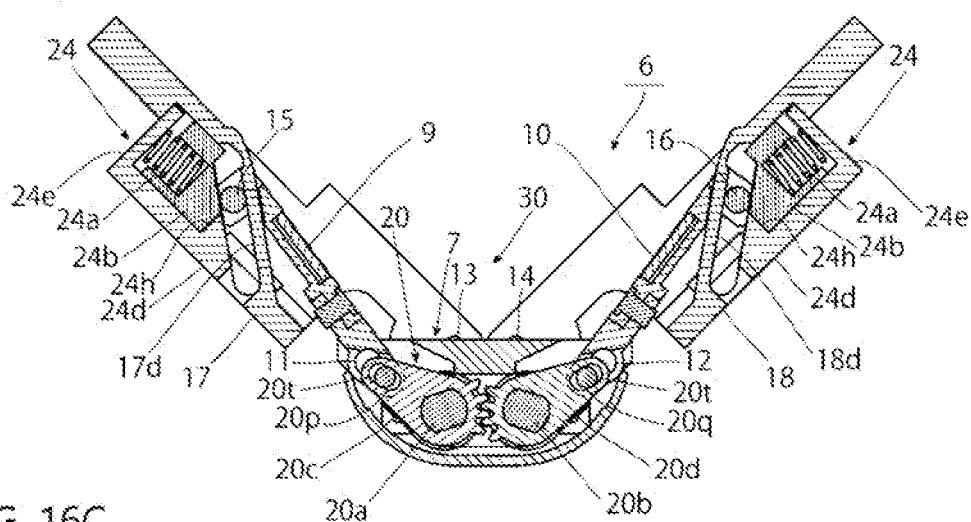
Figure 16C:
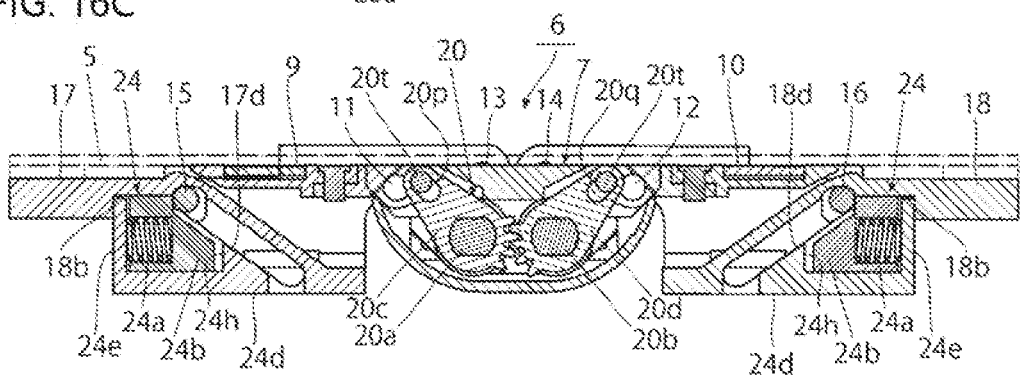

As shown in FIG. 16C, tension adjusting mechanisms 24, 24 urge a first attaching plate 17 and a second attaching plate 18 outward to generate a tension on a flexible display sheet 5 in an opened state in which the first attaching plate 17 and the second attaching plate 18 are opened 180 degrees. Sliders 24b, 24b pressed by a third hinge pin 15 and a fourth hinge pin 16 move outward and the first attaching plate 17 and the second attaching plate 18 is pulled outward, and as a result, the sliders 24b, 24b are spaced apart from bumped portions 24h, 24h.

On the other hand, as shown in FIG. 16A, 16B, in a state in which a flexible display sheet 5 is folded, a third hinge pin 15 and a fourth hinge pin 16 are spaced apart from the sliders 24b, 24b, so that the sliders 24b, 24b are pressed by compression coil springs 24a to abut against the bumped portions 24h.

As shown in FIG. 18, the first attaching plate 17 and the second attaching plate 18 across which a flexible display sheet 5 is stretched is movable in a front and rear direction as accompanied by contraction and expansion of the compression coil springs 24a. The compression coil springs 24a elastically push outward the first attaching plate 17 and the second attaching plate 18 relative to a front side plate 9 and a rear side plate 10 to adjust a tension of a flexible display sheet 5 stretched across the first attaching plate 17 and the second attaching plate 18. In other words, if the flexible display sheet 5 stretched across the first attaching plate 17 and the second attaching plate 18 is long, a distance between the first attaching plate 17 and the second attaching plate 18 is larger, X. On the other hand, if the flexible display sheet 5 stretched across the first attaching plate 17 and the second attaching plate 18 is short, a distance between the first attaching plate 17 and the second attaching plate 18 is smaller, Y. Therefore, if in the multiaxial hinge device 6 having the tension adjusting mechanisms 24, the flexible display sheet 5 is turned into an opened state by opening the first attaching plate 17 and the second attaching plate 18, it is possible to remove sags or creases of a long flexible display sheet 5, and to avoid an excessive tension on a short flexible display sheet 5.

It is noted that though reference is made herein to an embodiment in which the tension adjusting mechanisms 24 are provided both on the first attaching plate 17 and the second attaching plate 18, it is also possible to provide tension adjusting mechanisms 24 on only one of the first attaching plate 17 and the second attaching plate 18. It is possible to fix the number of tension adjusting mechanisms 24 provided on the first attaching plate 17 and the second attaching plate 18 as well as that of compression coil springs 24a provided on one tension adjusting mechanism 24, depending on a required preset tension range.

A multiaxial hinge device 6 according to the invention can smoothly realize and maintain a closed state of the first and the second casings. Furthermore, creases or sags are hardly produced on the flexible display sheet in a closed state of the first and the second casings.

The invention relates to a multiaxial hinge device suitably used in a folding electronic device, such as mobile phone, smartphone, electronic notebook, PDA, netbook, video display device, portable game machine and notebook PC, which is built by attaching a flexible display sheet across respective surfaces of a first and a second casings; it further relates to an electronic device using such a multiaxial hinge device. A multiaxial hinge device according to the invention can be used, not only for a mobile phone, but also for a folding electronic device which is constructed by coupling a first and a second casings on which a single flexible display sheet is attached, such that they can be opened and closed relative to each other, as described above.

What is claimed is:

1. A multiaxial hinge device for an electronic device, a flexible display sheet being attached across two surfaces of a first casing and a second casing, said multiaxial hinge device being provided on a lower side of said flexible display sheet and connecting said first casing and said second casing to each other so that said casings are openable and closable;
   a base plate provided across a right and left direction on respective rear end portions of said first casing and said second casing facing each other;
   a front side plate and the rear side plate rotatably attached respectively to the front and the rear sides of the base plate via a first hinge pin and a second hinge pin; and
   a first attaching plate and a second attaching plate attached to said base plate, thereby being rotatable via a first axially supporting pin portion and a second axially supporting pin portion, respective rear end portions of said first casing and said second casing being attached to respective free end sides of said base plate attached in a slidably rotatable manner to respective free end sides of said front side plate and said rear side plate via a third hinge pin and a fourth hinge pin;
   said multiaxial hinge device being constructed to be able to form space capable of accommodating a folded portion of said flexible display sheet folded when said first casing and said second casing are closed, between said base plate on one hand, and said front side plate and said rear side plate on the other;
   said multiaxial hinge device further comprising a synchronous rotation mechanism synchronously rotating said front side plate and said rear side plate as accompanied by opening and closing of said first casing and the second casing;
   an urging mechanism urging said front side plate and said rear side plate in a closing direction and of maintaining said closed state and said opened state of said front side plate and said rear side plate;
   said urging mechanism comprising compression coil springs compressed in said front and rear direction along said base plate, a pair of cam follower portions provided on said front side plate and said rear side plate to slide a slide cam as accompanied by rotations via said first hinge pin and said second hinge pin and to compress the compression coil springs in said front and rear direction; and
   a tension adjusting mechanism for adjusting a tension of said flexible display sheet by moving at least one of said first attaching plate and said second attaching plate in said front and rear direction depending on said tension of said flexible display sheet,
   said tension adjusting mechanism comprising a slider abutting against at least one of a third hinge pin and a fourth hinge pin, and a compression coil spring provided between at least one of said first attaching plate and said second attaching plate on one hand, and said slider on the other.

2. An electronic device using a multiaxial hinge according to claim 1.

3. A multiaxial hinge device for an electronic device, a flexible display sheet being attached across two surfaces of a first casing and a second casing, said multiaxial hinge device being provided on a lower side of said flexible display sheet and connecting said first casing and said second casing to each other so that said casings are openable and closable;
    a base plate provided across a right and left direction on respective rear end portions of said first casing and said second casing facing each other;
    a front side plate and the rear side plate rotatably attached respectively to the front and the rear sides of the base plate via a first hinge pin and a second hinge pin; and
    a first attaching plate and a second attaching plate attached to said base plate, thereby being rotatable via a first axially supporting pin portion and a second axially supporting pin portion, respective rear end portions of said first casing and said second casing being attached to respective free end sides of said base plate attached in a slidably rotatable manner to respective free end sides of said front side plate and said rear side plate via a third hinge pin and a fourth hinge pin;
    said multiaxial hinge device being constructed to be able to form space capable of accommodating a folded portion of said flexible display sheet folded when said first casing and said second casing are closed, between said base plate on one hand, and said front side plate and said rear side plate on the other;
    said multiaxial hinge device further comprising a synchronous rotation mechanism synchronously rotating said front side plate and said rear side plate as accompanied by opening and closing of said first casing and the second casing;
    an urging mechanism urging said front side plate and said rear side plate in a closing direction and of maintaining said closed state and said opened state of said front side plate and said rear side plate;
    said urging mechanism comprising compression coil springs compressed in said front and rear direction along said base plate, a pair of cam follower portions provided on said front side plate and said rear side plate to slide a slide cam as accompanied by rotations via said first hinge pin and said second hinge pin and to compress the compression coil springs in said front and rear direction; and
    a tension adjusting mechanism for adjusting a tension of said flexible display sheet by moving at least one of said first attaching plate and said second attaching plate in said front and rear direction depending on said tension of said flexible display sheet,
    said tension adjusting mechanism comprising a slider abutting against at least one of a third hinge pin and a fourth hinge pin, and a compression coil spring provided between at least one of said first attaching plate and said second attaching plate on one hand, and said slider on the other;
    wherein the synchronous rotation mechanism is built by meshing a first lever gear rotatably attached to said base plate via said third axially supporting pin and driven by a rotation via said first hinge pin of said front side plate with a second lever gear rotatably attached to said base plate via said fourth axially supporting pin and driven by a rotation of said rear side plate via said second hinge pin.

4. An electronic device using a multiaxial hinge according to claim 3.

5. A multiaxial hinge device for an electronic device, a flexible display sheet being attached across two surfaces of a first casing and a second casing, said multiaxial hinge device being provided on a lower side of said flexible display sheet and connecting said first casing and said second casing to each other so that said casings are openable and closable;
    a base plate provided across a right and left direction on respective rear end portions of said first casing and said second casing facing each other;
    a front side plate and the rear side plate rotatably attached respectively to the front and the rear sides of the base plate via a first hinge pin and a second hinge pin;
    a first attaching plate and a second attaching plate attached to said base plate, thereby being rotatable via a first axially supporting pin portion and a second axially supporting pin portion, respective rear end portions of said first casing and said second casing being attached to respective free end sides of said base plate attached in a slidably rotatable manner to respective free end sides of said front side plate and said rear side plate via a third hinge pin and a fourth hinge pin;
    said multiaxial hinge device being constructed to be able to form space capable of accommodating a folded portion of said flexible display sheet folded when said first casing and said second casing are closed, between said base plate on one hand, and said front side plate and said rear side plate on the other;
    said multiaxial hinge device further comprising a synchronous rotation mechanism synchronously rotating said front side plate and said rear side plate as accompanied by opening and closing of said first casing and the second casing;
    an urging mechanism urging said front side plate and said rear side plate in a closing direction and of maintaining said closed state and said opened state of said front side plate and said rear side plate;
    said urging mechanism comprising compression coil springs compressed in said front and rear direction along said base plate, a pair of cam follower portions provided on said front side plate and said rear side plate to slide a slide cam as accompanied by rotations via said first hinge pin and said second hinge pin and to compress the compression coil springs in said front and rear direction;
    wherein the synchronous rotation mechanism is built by meshing a first lever gear rotatably attached to said base plate via said third axially supporting pin and driven by a rotation via said first hinge pin of said front side plate with a second lever gear rotatably attached to said base plate via said fourth axially supporting pin and driven by a rotation of said rear side plate via said second hinge pin;
    wherein said synchronous rotation mechanism comprises a drawing mechanism drawing said front side plate and said rear side plate into a closed state and an opened state to stop their rotation,
    wherein said drawing mechanism comprises a fixing cam plate provided by rotatably linking a third hinge pin and a fourth hinge pin, a pair of rotary cam plates provided on said third axially supporting pin and said fourth axially supporting pin by locking their respective rotations, and compressing spring members for compressing an overlapping area of said fixing cam plate and said rotary cam plates.

* * * * *